(12) United States Patent
Sudoh

(10) Patent No.: US 9,329,367 B2
(45) Date of Patent: May 3, 2016

(54) ZOOM LENS, CAMERA, AND PORTABLE INFORMATION TERMINAL DEVICE

(71) Applicant: Yoshifumi Sudoh, Saitama (JP)

(72) Inventor: Yoshifumi Sudoh, Saitama (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/617,118

(22) Filed: Feb. 9, 2015

(65) Prior Publication Data

US 2015/0241675 A1 Aug. 27, 2015

(30) Foreign Application Priority Data

Feb. 25, 2014 (JP) ................................. 2014-034346

(51) Int. Cl.
*G02B 15/14* (2006.01)
*G02B 9/36* (2006.01)
(Continued)

(52) U.S. Cl.
CPC ............ *G02B 13/146* (2013.01); *G02B 15/173* (2013.01); *G03B 3/00* (2013.01); *G02B 5/005* (2013.01); *G02B 9/34* (2013.01); *G02B 9/36* (2013.01); *G02B 13/002* (2013.01); *G02B 13/004* (2013.01); *G02B 13/006* (2013.01); *G02B 13/009* (2013.01); *G02B 13/0015* (2013.01); *G02B 15/167* (2013.01); *G02B 15/20* (2013.01)

(58) Field of Classification Search
CPC ...... G02B 13/004; G02B 9/34; G02B 13/009; G02B 15/20; G02B 15/167; G02B 13/0015; G02B 13/002; G02B 13/006; G02B 5/005; G02B 9/36
USPC .......................... 359/683–688, 715, 740, 775
See application file for complete search history.

(56) References Cited

U.S. PATENT DOCUMENTS 7,885,014 B2* 2/2011 Inomoto .............. G02B 15/173
359/683
8,149,516 B2* 4/2012 Yoshimi ............... G02B 15/173
359/683

(Continued)

FOREIGN PATENT DOCUMENTS

JP 06-289295 A 10/1994
JP 08-005920 A 1/1996

(Continued)

OTHER PUBLICATIONS

U.S. Appl. No. 14/510,238, filed Oct. 9, 2014, Sudoh.

(Continued)

*Primary Examiner* — Evelyn A Lester
(74) *Attorney, Agent, or Firm* — Oblon, McClelland, Maier & Neustadt, L.L.P.

(57) ABSTRACT

A zoom lens includes, in order from an object side to an image side, first, second, third, and fourth lens groups with positive, negative, negative, and positive refractive powers, respectively. When varying magnification from a short focal length end to a long focal length end, the second lens group is moved to the image side, the third lens group is moved, and the first and fourth lens groups are fixed. The fourth lens group is constituted of a lens group on the object side and a lens group on the image side with a largest distance in the fourth lens group between them. Each of a refractive index, Abbe number, a partial dispersion ratio, and the like of each of at least one positive lens of the lens group on the object side and two positive lenses of the first lens group is regulated to be in a predetermined range.

12 Claims, 14 Drawing Sheets

(51) Int. Cl.
  *G02B 13/14* (2006.01)
  *G03B 3/00* (2006.01)
  *G02B 15/173* (2006.01)
  *G02B 13/00* (2006.01)
  *G02B 9/34* (2006.01)
  *G02B 15/167* (2006.01)
  *G02B 15/20* (2006.01)
  *G02B 5/00* (2006.01)

(56) References Cited

U.S. PATENT DOCUMENTS

| | | | |
|---|---|---|---|
| 8,599,494 B2 * | 12/2013 | Yoshimi | G02B 15/161 |
| | | | 359/687 |
| 2007/0201144 A1 | 8/2007 | Sudoh | |
| 2007/0247726 A1 | 10/2007 | Sudoh | |
| 2008/0278779 A1 | 11/2008 | Nishina et al. | |
| 2009/0067060 A1 | 3/2009 | Sudoh | |
| 2009/0122418 A1 | 5/2009 | Atsuumi et al. | |
| 2009/0135500 A1 | 5/2009 | Sudoh et al. | |
| 2009/0147375 A1 | 6/2009 | Sudoh et al. | |
| 2009/0323200 A1 | 12/2009 | Sudoh | |
| 2010/0027136 A1 | 2/2010 | Ohashi et al. | |
| 2010/0296180 A1 | 11/2010 | Sudoh et al. | |
| 2011/0037878 A1 * | 2/2011 | Wakazono | G02B 15/161 |
| | | | 359/688 |
| 2011/0043927 A1 | 2/2011 | Sudoh | |
| 2011/0069402 A1 | 3/2011 | Sudoh | |
| 2011/0222169 A1 | 9/2011 | Sudoh | |
| 2011/0228408 A1 | 9/2011 | Sudoh | |
| 2012/0127586 A1 | 5/2012 | Sudoh | |
| 2012/0224270 A1 * | 9/2012 | Sakamoto | G02B 15/17 |
| | | | 359/688 |
| 2013/0215321 A1 | 8/2013 | Nakayama | |
| 2014/0029112 A1 * | 1/2014 | Sanjo | G02B 15/14 |
| | | | 359/687 |
| 2014/0293457 A1 | 10/2014 | Sudoh | |
| 2015/0043087 A1 * | 2/2015 | Sudoh | G02B 15/14 |
| | | | 359/688 |
| 2015/0070780 A1 | 3/2015 | Sudoh | |
| 2015/0130961 A1 * | 5/2015 | Sudoh | G02B 27/4211 |
| | | | 359/688 |
| 2015/0237265 A1 * | 8/2015 | Sudoh | G02B 15/14 |
| | | | 359/688 |

FOREIGN PATENT DOCUMENTS

| | | |
|---|---|---|
| JP | 08-082742 A | 3/1996 |
| JP | 2003-262793 A | 9/2003 |
| JP | 2009-037036 A | 2/2009 |
| JP | 2009-282200 A | 12/2009 |

OTHER PUBLICATIONS

U.S. Appl. No. 14/584,167, filed Dec. 29, 2014, Sudoh.
U.S. Appl. No. 14/572,973, filed Dec. 17, 2014, Sudoh.
U.S. Appl. No. 14/510,238, filed Oct. 9, 2014.
U.S. Appl. No. 14/584,167, filed Dec. 29, 2014.
U.S. Appl. No. 14/572,973, filed Dec. 17, 2014.

* cited by examiner

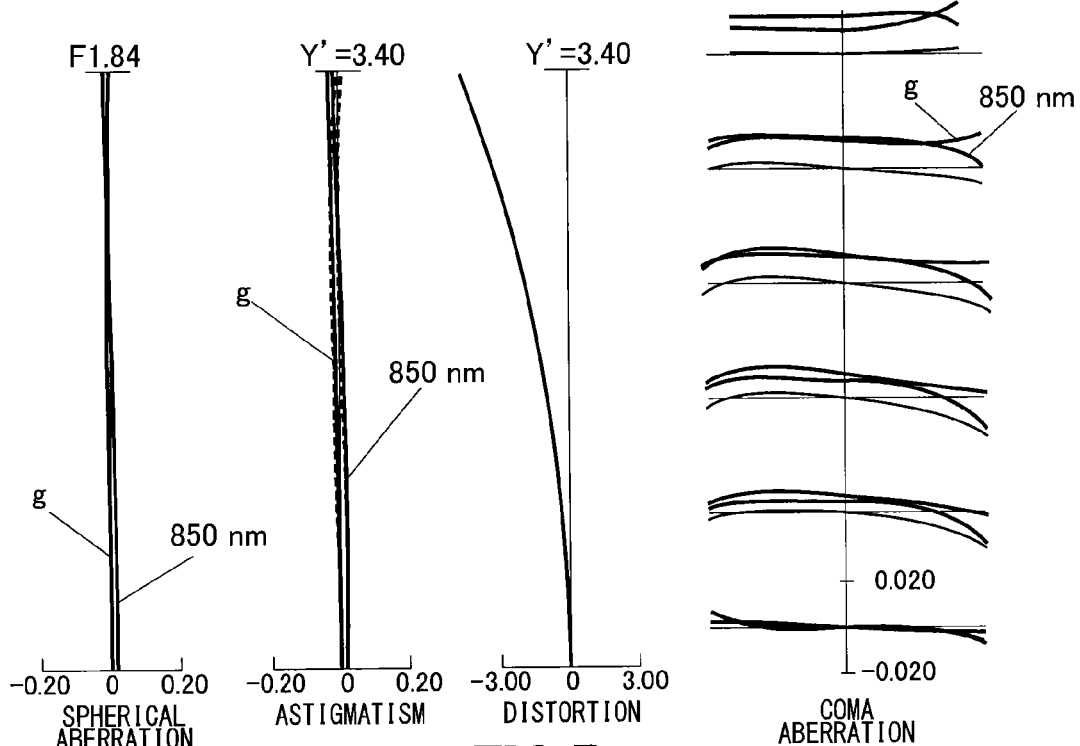
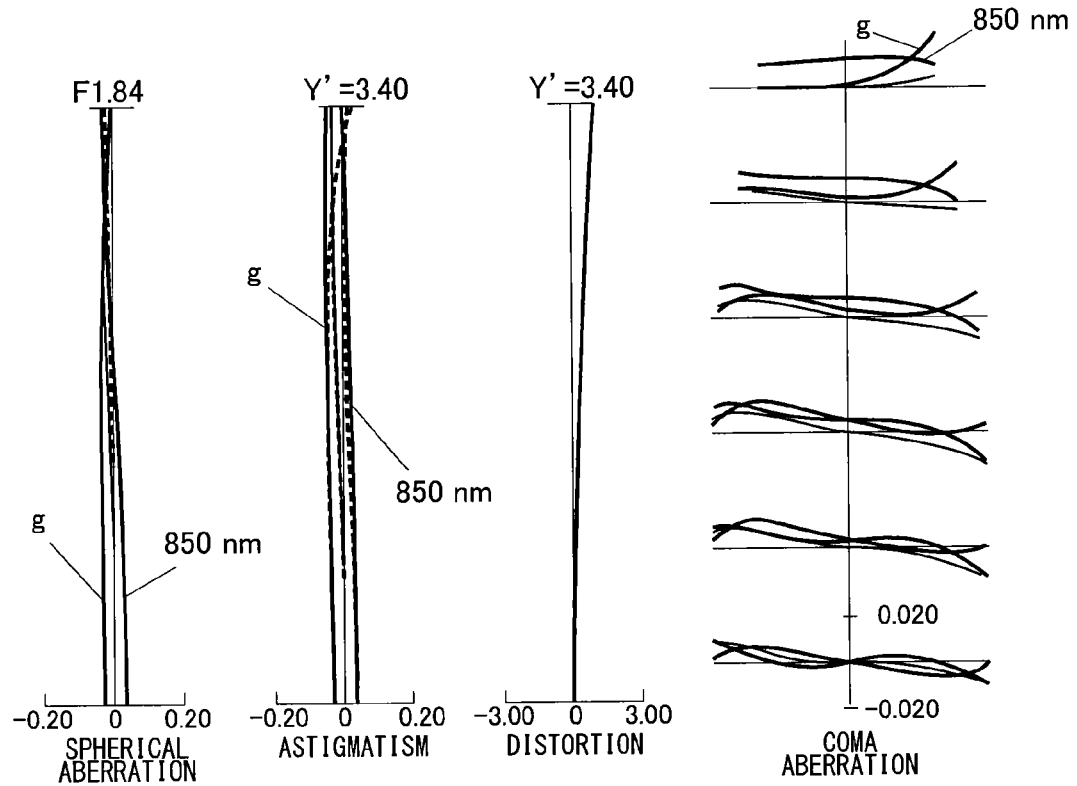

ZOOM LENS, CAMERA, AND PORTABLE INFORMATION TERMINAL DEVICE

CROSS-REFERENCE TO RELATED APPLICATIONS

The present application is based on and claims priority from Japanese Patent Application Number 2014-034346, filed Feb. 25, 2014, the disclosure of which is hereby incorporated by reference herein in its entirety.

BACKGROUND

The present invention relates to a zoom lens, and in particular, relates to a zoom lens which is small in size with high picture quality and has a variable magnification range which sufficiently covers a normal photographing range, a camera which has such a zoom lens as a photographing optical system, and a portable information terminal device which has such a zoom lens as a photographing optical system of a camera function part.

The market for cameras used for security or the like has greatly increased, and there have been a broad range of requests. In particular, high picture quality and high variable magnification are always desired by users, and on which great emphasis is laid. Therefore, both high performance and high variable magnification are also requested for a zoom lens used as a photographing lens.

Here, in terms of high performance, resolution corresponding to at least a 1 mega-pixel to 5 mega-pixel image sensor is needed throughout an entire zoom range. Additionally, in terms of high variable magnification, approximately a 16× magnification is considered to be necessary.

In addition, so as to perform photographing even in darkness, it is desired that aberration be sufficiently corrected even in a near-infrared wavelength region.

Further, a wide-field angle is also desired, and a half-field angle at a short focal length end of a zoom lens is preferably equal to or more than 20 degrees.

Furthermore, a large diameter is also desired, an f-number at a short focal length (also referred to as wide angle) end is preferably less than or equal to 2.0.

As a conventional example of a zoom lens which includes, in order from an object side to an image side, a first lens group with a positive refractive power, a second lens group with a negative refractive power, a third lens group with a negative refractive power, and a fourth lens group with a positive refractive power, and in which the first lens group is constituted of, in order from the object side to the image side, a cemented lens of a negative lens and a positive lens, a positive lens, and a positive lens, and an anomalous dispersion glass is used in the first lens group, there are zoom lenses disclosed in Japanese Patent Application Publication Numbers 2003-262793, H08-005920, H06-289295, H08-082742, and the like.

In Japanese Patent Application Publication Numbers 2003-262793, H08-005920, H06-289295, H08-082742, no consideration for aberration correction in a near-infrared wavelength region is given.

SUMMARY

An objective of the present invention is to provide a zoom lens which has a high variable magnification ratio, sufficiently corrects aberration even in a near-infrared wavelength region, and is small in size.

In order to achieve the above object, an embodiment of the present invention provides: a zoom lens comprising: in order from an object side to an image side, a first lens group with a positive refractive power; a second lens group with a negative refractive power; a third lens group with a negative refractive power; and a fourth lens group with a positive refractive power, and when varying magnification from a short focal length end to a long focal length end, the first lens group is fixed, the second lens group is moved to the image side, the third lens group is moved, and the fourth lens group is fixed, wherein the first lens group is constituted of, in order from the object side to the image side, a cemented lens of a negative lens and a first positive lens, a second positive lens, and a third positive lens, and the fourth lens group is constituted of a lens group arranged on the object side and a lens group arranged on the image side with a largest distance in the fourth lens group between them, and at least one positive lens of positive lenses included in the lens group arranged on the object side of the fourth lens group and the second and third positive lenses of the first lens group satisfy Conditional Expression (1): $1.40 < n_d < 1.65$, Conditional Expression (2): $65.0 < v_d < 100.0$, and Conditional Expression (3): $0.015 < P_{g,F} - (-0.001802 \times v_d + 0.6483) < 0.060$, where $N_d$, $v_d$, and $P_{g,F}$ are a refractive index, Abbe number, and a partial dispersion ratio, respectively, of each of the at least one positive lens of positive lenses included in the lens group arranged on the object side of the fourth lens group, and the second and third positive lenses of the first lens group, and here, $P_{g,F} = (n_g - n_F)/(n_F - n_C)$, and $n_g$, $n_F$, and $n_C$ are refractive indexes with respect to g line, F line, and C line, respectively, of each of the at least one positive lens of positive lenses included in the lens group arranged on the object side of the fourth lens group, and the second and third positive lenses of the first lens group.

BRIEF DESCRIPTION OF THE DRAWINGS

Each of FIGS. 1A to 1C is a diagram which schematically shows a structure of an optical system of a zoom lens in Example (numerical value example) 1 according to a first embodiment of the present invention and a zoom trajectory associated with zooming.

Each of FIGS. 5A to 5C is a diagram which schematically shows a structure of an optical system of a zoom lens in Example (numerical value example) 2 according to a second embodiment of the present invention and a zoom trajectory associated with zooming.

FIG. 6 shows aberration curve diagrams of spherical aberration, astigmatism, distortion, and coma aberration at the short focal length end of the zoom lens according to Example 2 of the present invention shown in FIG. 5A.

FIG. 7 shows aberration curve diagrams of spherical aberration, astigmatism, distortion, and coma aberration at the mean focal length of the zoom lens according to Example 2 of the present invention shown in FIG. 5B.

Each of FIGS. 9A to 9C is a diagram which schematically shows a structure of an optical system of a zoom lens in Example (numerical value example) 3 according to a third embodiment of the present invention and a zoom trajectory associated with zooming.

Each of FIGS. 13A to 13C is a diagram which schematically shows a structure of an optical system of a zoom lens in Example (numerical value example) 4 according to a fourth embodiment of the present invention and a zoom trajectory associated with zooming.

DETAILED DESCRIPTION OF THE PREFERRED EMBODIMENTS

Figure 1A:
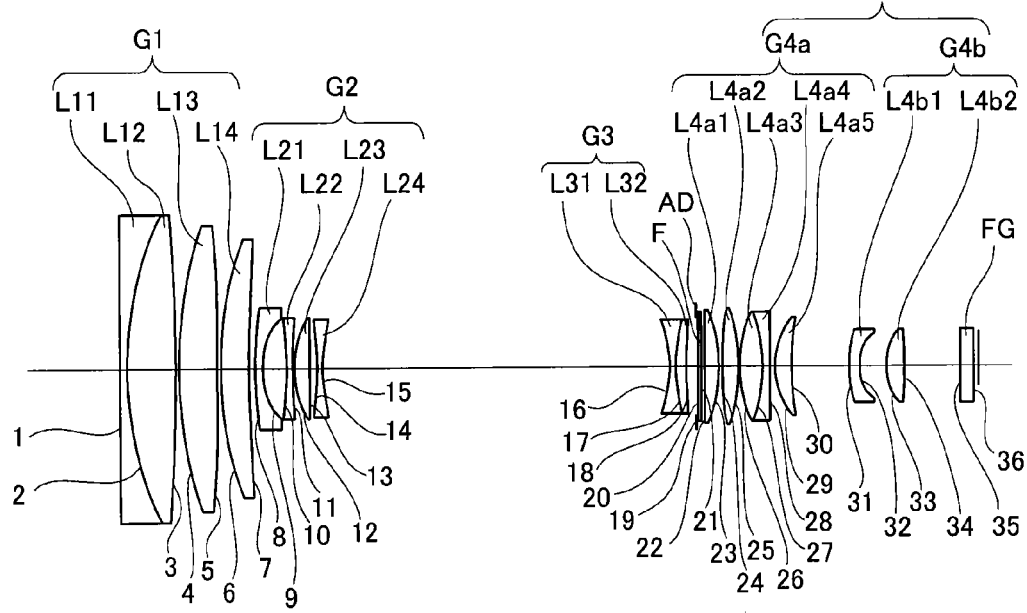
FIGS. 1A, 1B, and 1C are cross-sectional views of the optical system of the zoom lens along an optical axis at a short focal length end (wide-angle end), a mean focal length, and a long focal length end (telephoto end), respectively.

Hereinafter, based on embodiments of the present invention, with reference to the drawings, a zoom lens, a camera, and a portable information terminal device according to the embodiments of the present invention will be explained in detail.

Before explaining specific examples, firstly, a zoom lens according to a fundamental embodiment of the present invention will be explained.

The zoom lens includes in order from an object side to an image side a first lens group G1 with a positive refractive power, a second lens group G2 with a negative refractive power, a third lens group G3 with a negative refractive power, and a fourth lens group G4 with a positive refractive power. That is, the zoom lens is constituted of four lens groups of positive, negative, negative, and positive refractive powers, and the second lens group G2 is constituted as a so-called variator, which covers a main magnification-varying function.

When varying magnification from a short focal length end to a long focal length end, the first lens group G1 is fixed, the second lens group G2 is moved to the image side, the third lens group G3 is moved, and the fourth lens group G4 is fixed, and therefore, a distance between the first lens group G1 and the second lens group G2 becomes large, and a distance between the second lens group G2 and the third lens group G3 becomes small.

In a case of a large-diameter lens which is wide-angle as in the present invention, when the first lens group G1 is constituted of a negative lens L11, a positive lens (first positive lens) L12, a positive lens (second positive lens) L13, and a positive lens (third positive lens) L14, it is possible to sufficiently correct each aberration. Here, exchanges of aberrations between the negative lens L11 and the positive lens L12 tend to occur greatly, and therefore, the negative lens L11 and the positive lens L12 are preferably cemented. And in a case of correcting axial chromatic aberration at the long focal length end, it is preferable to use a large amount of an optical material having an anomalous dispersion characteristic for the first lens group G1. However, the optical material having the anomalous dispersion characteristic has a tendency in which a linear expansion coefficient is large, and it is not desired to be used for a large cemented lens, and therefore, in the embodiment, the optical material having the anomalous dispersion characteristic is used for the positive lens L13 and the positive lens L14.

Additionally, in a case of correcting axial chromatic aberration at the short focal length end, it is preferable to use an optical material having an anomalous dispersion characteristic for the fourth lens group G4. In particular, when the fourth lens group G4 is constituted of a lens group G4a arranged on the object side (lens group arranged on the object side of the fourth lens group) and a lens group G4b arranged on the image side (lens group arranged on the image side of the fourth lens group) with a largest distance in the fourth lens group G4 between them, an on-axis luminous flux becomes thickest in the lens group G4a, and when using the optical material having the anomalous dispersion characteristic for a positive lens included in the lens group G4a, an effect for the axial chromatic aberration is high.

At least one positive lens of positive lenses included in the lens group G4a and the positive lenses L13 and L14 of the first lens group G1 preferably satisfy Conditional Expression (1): $1.40 < n_d < 1.65$, Conditional Expression (2): $65.0 < v_d < 100.0$, and Conditional Expression (3): $0.015 < P_{g,F} - (-0.001802 \times v_d + 0.6483) < 0.060$, where $N_d$, $v_d$, and $P_{g,F}$ are a refractive index, Abbe number, and a partial dispersion ratio, respectively, of each of the at least one positive lens of positive lenses included in the lens group G4a, and the positive lenses L13 and L14 of the first lens group G1, and here, $P_{g,F} = (n_g -$ $n_F$)/($n_F$−$n_C$), and $n_g$, $n_F$, and $n_C$ are refractive indexes with respect to g line, F line, and C line, respectively, of each of the at least one positive lens of positive lenses included in the lens group G4a, and the positive lenses L13 and L14 of the first lens group G1.

By using an optical material high in anomalous dispersion characteristic and low in dispersion which satisfies the Conditional Expressions, it is possible to sufficiently correct chromatic aberration.

Also note that a lower limit value of $P_{g,F}$−(−0.001802×$v_d$+0.6483) is preferably 0.030.

Further, in order to sufficiently correct axial chromatic aberration at the long focal length end while correcting various aberrations, Conditional Expression (4): 0.5<f13/f14<1.1 is preferably satisfied, where f13 is a focal length of the positive lens L13 included in the first lens group G1, and f14 is a focal length of the positive lens L14 included in the first lens group G1.

By satisfying Conditional Expression (4), it is possible to correct aberration mutually by the positive lens L13 and the positive lens L14, and sufficiently correct the axial chromatic aberration at the long focal length end while correcting the various aberrations.

Furthermore, in order to sufficiently correct the axial chromatic aberration at the long focal length end, the negative lens L11 included in the first lens group G1 preferably satisfies Conditional Expression (5): 1.70<$n_d$<1.95, and Conditional Expression (6): 35.0<$v_d$<50.0, where $n_d$ is a refractive index of the negative lens L11 included in the first lens group G1, and $v_d$ is Abbe number of the negative lens L11 included in the first lens group G1.

By satisfying the above Conditional Expressions (5) and (6), the positive lenses included in the first lens group G1 and chromatic aberration correction are balanced, and therefore, it is possible to sufficiently correct the axial chromatic aberration at the long focal length end while correcting the various aberrations.

In order to sufficiently correct the axial chromatic aberration at the short focal length end, at least two positive lenses of the positive lenses included in the lens group G4a preferably satisfy the above Conditional Expressions (1), (2), and (3).

More preferably, all the positive lenses included in the lens group G4a satisfy the above Conditional Expressions (1), (2), and (3).

However, when using anomalous dispersion glass a lot for the lens group G4a, defocus change due to temperature change at the short focal length end becomes large. Therefore, distances in the lens group G4a preferably change so as to cancel the defocus change due to the temperature change. In a case of the lens structure of the present embodiment, a distance between a lens on a most object side in the lens group G4 and a second lens from the object side in the fourth lens group G4 preferably changes due to the temperature change. The distance has effectiveness for defocus, and it is possible to suppress the defocus change due to the temperature change without a balance of entire aberration corrections.

A method of moving the entire third lens group G3 to perform correction is also preferable as well.

In order to achieve a zoom lens having a large diameter, a structure of the lens group G4a is important. Accordingly, the lens group G4a is preferably constituted of, in order from the object side to the image side, a positive lens, a positive lens, a positive lens, a negative lens, and a positive lens. By correcting aberration mutually by many positive lenses, regardless of having the large diameter, it is possible to sufficiently correct aberration.

In order to achieve higher performance, Conditional Expression (7): 0.2<D4a/D4<0.4 is preferably satisfied, where D4a is a largest inter-lens distance (largest distance between the lenses) in the fourth lens group G4, and D4 is a thickness of the fourth lens group G4.

A balance of aberration correction is established by providing the largest distance D4a between the lens group G4a and the lens group G4b. When exceeding an upper limit value of the above Conditional Expression (7), there is no space of each of the lenses constituting the fourth lens group G4, and it is difficult to perform aberration correction. When falling below a lower limit value of the above Conditional Expression (7), the distance D4a between the lens group G4a and the lens group G4b becomes too small, and it is difficult to establish the balance of the aberration correction by the lens group G4a and the lens group G4b.

In order to achieve further higher performance, Conditional Expression (8): 0.7<f1/ft<0.9, and Conditional Expression (9): 0.1<f4/ft<0.3 are preferably satisfied, where f1 is a focal length of the first lens group G1, f4 is a focal length of the fourth lens group G4, and ft is a focal length of an entire optical system at the long focal length end.

By satisfying the above Conditional Expressions (8) and (9), it is possible to perform aberration correction throughout an entire zoom range.

In the embodiment of the present invention, focusing is preferably performed by the first lens group G1.

In a case where focusing is performed by the first lens group G1, a position of the first lens group G1 as a focus group is the same at any position in a zoom range, and there is an advantage in that focus does not change even when performing zooming. In particular, in a case of performing video recording, there is an advantage in that there is no need to perform focusing again when performing zooming.

Additionally, in a case of using anomalous dispersion glass for the first lens group G1 as in the embodiment of the present invention, defocus change due to temperature change at the long focal length end becomes large.

However, in a case where focusing is performed by the first lens group G1, It is possible to correct defocus change due to temperature change at a focal length end by a small movement amount of the first lens group G1.

When reduction of an amount of light reaching an imaging plane is needed, an aperture diameter can be made small; however, it is preferable in terms of prevention of reduction of resolution due to diffraction phenomenon that the reduction of the amount of light be performed by use of an ND filter or the like without greatly changing the aperture diameter.

Meanwhile, the above-described zoom lens according to the embodiment of the present invention is used as a photographing optical system or as a video recording optical system, and a camera such as a so-called digital camera or a video recording camera (so-called movie camera) can be structured.

For such cameras, having the zoom lens as described above as the photographing optical system makes it possible to achieve a camera which is small in size with high picture quality and has a variable magnification range which sufficiently covers a normal photographing range.

Additionally, a so-called portable information terminal device having a photographing function part such as a camera function or the like can also be structured by using the zoom lens as described above as the photographing optical system.

For such a portable information terminal device, having the photographing function and the zoom lens as described above as the photographing optical system makes it possible to provide a portable information terminal device which is small in size with high performance and has a variable magnification range which sufficiently covers a normal photographing range. Accordingly, for users, it is possible to photograph an image with high picture quality with a portable information terminal device excellent in portability and send the image to an external device.

As described above, according to the embodiment of the present invention, it is possible to achieve a zoom lens in which a variable magnification ratio is approximately 16×, while a half-field angle at a short focal length end is approximately 25 degrees, an f-number at the short focal length end is less than or equal to 2.0, and an f-number at a long focal length end is approximately 2.4, and which includes approximately 17 lenses and is relatively inexpensive, sufficiently corrects aberration even in a near-infrared wavelength region, and is small in size and has resolution corresponding to a 1 mega-pixel to 5 mega-pixel image sensor.

According to the embodiment of the present invention, it is possible to favorably correct axial chromatic aberration, and provide a zoom lens with high performance. And therefore, it is possible to achieve a camera which obtains favorable portrayal from a visible region to a near-infrared region.

According to the embodiment of the present invention, it is possible to provide a zoom lens with higher performance. And therefore, it is possible to provide a camera with high picture quality having further higher resolution.

According to the embodiment of the present invention, it is possible to provide a zoom lens in which a focus position does not change at any position in the zoom range. And therefore, it is possible to achieve a camera in which focusing is not required to be performed again for change of position in the zoom range.

According to the embodiment of the present invention, it is possible to provide a camera which is small in size with high picture quality, and as a photographing optical system, uses a zoom lens in which a variable magnification ratio is approximately 16×, while a half-field angle at a short focal length end is approximately 25 degrees, an f-number at the short focal length end is less than or equal to 2.0, and an f-number at a long focal length end is approximately 2.4, and which includes approximately 17 lenses and is relatively inexpensive, sufficiently corrects aberration even in a near-infrared wavelength region, and is small in size and has resolution corresponding to a 1 mega-pixel to 5 mega-pixel image sensor. And therefore, for users, it is possible to photograph an image with high picture quality with a camera excellent in portability.

According to the embodiment of the present invention, it is possible to provide a camera which is small in size, performs video recording with high picture quality, and as a photographing optical system of a camera function part, uses a zoom lens in which a variable magnification ratio is approximately 16×, while a half-field angle at a short focal length end is approximately 25 degrees, an f-number at the short focal length end is less than or equal to 2.0, and an f-number at a long focal length end is approximately 2.4, and which includes approximately 17 lenses and is relatively inexpensive, sufficiently corrects aberration even in a near-infrared wavelength region, and is small in size and has resolution corresponding to a 1 mega-pixel to 5 mega-pixel image sensor. And therefore, for users, it is possible to perform video recording with high picture quality with a camera excellent in portability.

According to the embodiment of the present invention, it is possible to provide a portable information terminal device which is small in size with high picture quality, and has a variable magnification range which sufficiently covers a normal photographing range by having a photographing function and including the zoom lens as described above as a photographing optical system. And therefore, for users, it is possible to photograph an image with high picture quality with a portable information terminal device excellent in portability and send the image to an external device.

First Embodiment

EXAMPLE 1

Next, based on the above-described fundamental embodiment of the present invention, specific examples will be explained in detail. The following Examples 1 to 4 are examples of specific structures by numerical value examples of zoom lenses according to first to fourth embodiments of the present invention. FIG. 1A to FIG. 4 are for explaining a zoom lens of Example 1 according to the first embodiment of the present invention. FIG. 5A to FIG. 8 are for explaining a zoom lens of Example 2 according to the second embodiment of the present invention. FIG. 9A to FIG. 12 are for explaining a zoom lens of Example 3 according to the third embodiment of the present invention. FIG. 13A to FIG. 16 are for explaining a zoom lens of Example 4 according to the fourth embodiment of the present invention.

A zoom lens of each of Examples 1 to 4 in which in order from an object side to an image side a first lens group G1 with a positive refractive power, a second lens group G2 with a negative refractive power, a third lens group G3 with a negative refractive power, and a fourth lens group G4 with a positive refractive power are arranged, is a so-called zoom lens having a four-lens-group structure of positive, negative, negative, and positive refractive powers.

In the zoom lens of each of Examples 1 to 4, as an optical element constituted of a parallel plate arranged on an image side of the fourth lens group G4, an optical filter of various kinds such as an optical low-pass filter, ultraviolet-cut filter, or the like, a cover glass (seal glass) of a light-receiving image sensor such as a CMOS (Complementary Metal-Oxide Semiconductor) image sensor, a CCD (Charge-Coupled Device) image sensor, or the like is envisaged, and here, as an equivalent transparent parallel plate, it is collectively referred to as a filter or the like FG.

Additionally, as a parallel plate arranged on an object side or on the image side of an aperture AD, a filter F of various kinds such as an ND filter is envisaged.

Glass materials of optical glass used in each of Examples 1 to 4 are described by optical glass material names of products of OHARA INC. and HOYA CORPORATION.

In all Examples, all the materials of lenses are optical glass; however, resin lenses can be used.

Aberrations in the zoom lens of each of Examples 1 to 4 are sufficiently corrected, and therefore, it is possible to correspond to a 1 mega-pixel to 5 mega-pixel image sensor or an image sensor having the number of pixels equal to or more than the 1 mega-pixel to 5 mega-pixel image sensor. By structuring zoom lenses according to the first to fourth embodiments of the present invention, it is possible to achieve sufficient miniaturization, and ensure extremely favorable image performance, which is evident from each aberration diagram in each of Examples 1 to 4.

Figure 1B:
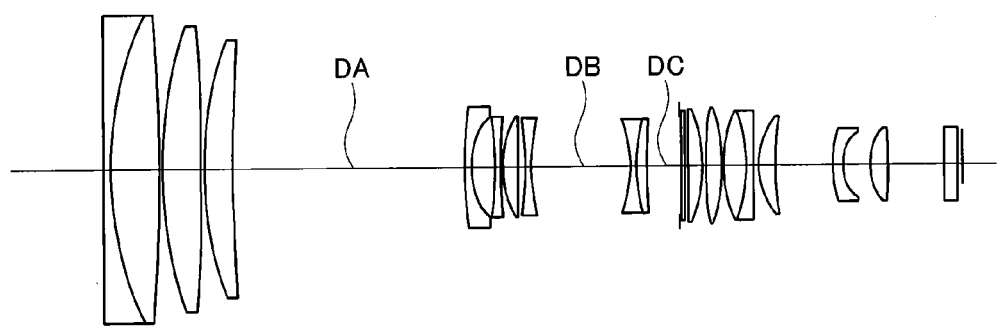
Figure 1C:
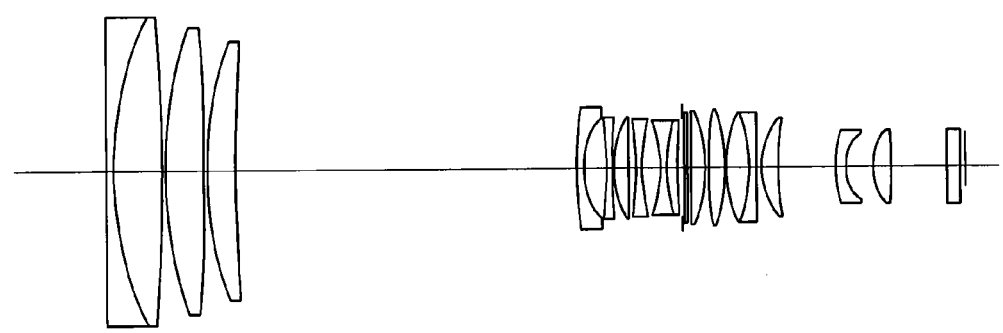

The meaning of each of reference signs common in Examples 1 to 4 is as follows.
f: focal length of entire optical system
F: f-number
ω: half-field angle (degree)
R: curvature radius
D: distance between surfaces $n_d$: refractive index
$v_d$: Abbe number FIGS. 1A to 1C show a lens structure of an optical system of a zoom lens of Example 1 according to the first embodiment of the present invention, and a zoom trajectory associated with zooming from a short focal length end, that is, a wide-angle end (Wide) to a long focal length end, that is, telephoto end (Tele) via a predetermined mean focal length (Mean). FIG. 1A is a cross-sectional view at the short focal length end, that is, at the wide-angle end, FIG. 1B is a cross-sectional view at the predetermined mean focal length, and FIG. 1C is a cross-sectional view at the long focal length end, that is, at the telephoto end. Please note that in FIGS. 1A to 1C which show arrangement of lens groups of Example 1, the left side in the drawing is an object (photographic subject) side, and the right side in the drawing is an image side.

The zoom lens shown in FIGS. 1A to 1C includes, in order from the object side to the image side, a first lens group G1 with a positive refractive power, a second lens group G2 with a negative refractive power, a third lens group G3 with a negative refractive power, and a fourth lens group G4 with a positive refractive power.

The fourth lens group G4 includes a lens group G4a arranged on the object side (lens group arranged on the object side of the fourth lens group) and a lens group G4b arranged on the image side (lens group arranged on the image side of the fourth lens group) with a largest distance in the fourth lens group G4 between them.

Each of the first to fourth lens groups G1 to G4 is held by a holding frame or the like which is suitably common per lens group, and when performing zooming or the like, the second lens group G2 and the third lens group G3 operate integrally per lens group, and an aperture AD is provided integrally with the fourth lens group G4. In FIG. 1A, a surface number of each optical surface is shown. Please note that each reference sign in FIGS. 1A to 1C is independently used in each Example in order to avoid complicated explanation by increase in digit number of reference signs. Therefore, even when reference signs common in the drawings of other Examples are used, they do not always show elements common in other Examples.

When varying magnification from the short focal length end (wide-angle end) to the long focal length end (telephoto end), the first lens group G1 is fixed, the second lens group G2 is moved to the image side, the third lens group G3 is moved, and the fourth lens group G4 is fixed. Accordingly, the zoom lens moves such that a distance between the first lens group G1 and the second lens group G2 becomes large, and a distance between the second lens group G2 and the third lens group G3 becomes small.

The first lens group G1 of the zoom lens of Example (numerical value example) 1 which is the first embodiment according to the present invention shown in FIGS. 1A to 1C includes, in order from the object side to the image side, a negative lens L11 constituted of a negative meniscus lens having a concave surface on the image side, a positive lens (first positive lens) L12 constituted of a biconvex lens having a convex surface on an object side which has larger curvature than that on the image side, a positive lens (second positive lens) L13 constituted of a biconvex lens having a convex surface on the object side which has larger curvature than that on the image side, and a positive lens (third positive lens) L14 constituted of a positive meniscus lens having a convex surface on the object side.

Two lenses of the negative lens L11 and the positive lens L12 of the first lens group G1 are closely in contact with each other and cemented integrally, and form a cemented lens of the two lenses.

The second lens group G2 includes, in order from the object side to the image side, a negative lens L21 constituted of a negative meniscus lens having a concave surface on the image side, a negative lens L22 constituted of a biconcave lens having a concave surface on the object side which has larger curvature than that on the image side, a positive lens L23 constituted of a positive meniscus lens having a convex surface on the object side, and a negative lens L24 constituted of a biconcave lens having a concave surface on the image side which has larger curvature than that on the object side.

The third lens group G3 includes, in order from the object side to the image side, a negative lens L31 constituted of a biconcave lens having a concave surface on the object side which has larger curvature than that on the image side, and a positive lens L32 constituted of a positive meniscus lens having a convex surface on the object side.

Two lenses of the negative lens L31 and the positive lens L32 of the third lens group G3 are closely in contact with each other and cemented integrally, and form a cemented lens of the two lenses.

Between the third lens group G3 and the fourth lens group G4, the aperture AD and a filter F of various kinds such as an ND filter or the like constituted of a parallel plate and arranged adjacent to the aperture AD are inserted, and held integrally with the fourth lens group G4.

As described above, the fourth lens group G4 includes the lens group G4a arranged on the object side and the lens group G4b arranged on the image side with the largest distance in the fourth lens group G4 between them.

The lens group G4a arranged on the object side of the fourth lens group G4 includes, in order from the object side to the image side, a positive lens L4a1 constituted of a biconvex lens having a convex surface on the image side which has larger curvature than that on the object side, a positive lens L4a2 constituted of a biconvex lens having a convex surface on the image side which has larger curvature than that on the object side, a positive lens L4a3 constituted of a biconvex lens having a convex surface on the image side which has larger curvature than that on the object side, a negative lens L4a4 constituted of a biconcave lens having a concave surface on the object side which has larger curvature than that on the image side, and a positive lens L4a5 constituted of a positive meniscus lens having a convex surface on the object side.

The positive lens L4a3 and the negative lens L4a4 of the lens group G4a are closely in contact with each other and cemented integrally, and form a cemented lens of two lenses.

The lens group G4b arranged on the image side of the fourth lens group G4 includes, in order from the object side to the image side, a negative lens L4b1 constituted of a negative meniscus lens having a concave surface on the image side, and a positive lens L4b2 constituted of a biconvex lens having a convex surface on the object side which has larger curvature than that on the image side.

On the image side of the lens group G4b, a filter or the like FG is arranged, which is envisaged to be an optical filter of various kinds such as an optical low-pass filter, an infrared-cut filter, or the like, or a cover glass (seal glass) of a light-receiving image sensor such as a CMOS image sensor, a CCD image sensor, or the like, and, here, shown as an equivalent transparent parallel plate.

In this case, as shown in FIGS. 1A to 1C, when varying magnification from the short focal length end to the long focal length end, the first lens group G1 is fixed, the second lens group G2 is moved to the image side, the third lens group G3 is moved, and the fourth lens group G4 is fixed. Therefore, the distance between the lens group G1 and the second lens group G2 becomes large, and the distance between the second lens group G2 and the third lens group G3 becomes small.

Focusing is preferably performed by the first lens group G1.

This is because, in a case where focusing is performed by the first lens group G1, there is an advantage in that a position of the first lens group G1 as a focus group becomes the same at any position in the zoom range.

In Example 1, a focal length f of an entire optical system, an f-number F, and a half-field angle ω vary in rages of f=7.72-30.00-116.38, F=1.85-1.85-2.33, and ω=24.87-6.44-1.67, respectively, by zooming from the short focal length end to the long focal length end. An optical characteristic of each optical element is shown in Table 1.

TABLE 1

| | R | D | $n_d$ | $v_d$ | Glass |
|---|---|---|---|---|---|
| 1 | 5574.748 | 1.45 | 1.83481 | 42.72 | S-LAH55V (OHARA) |
| 2 | 71.981 | 9.69 | 1.60300 | 65.44 | S-PHM53 (OHARA) |
| 3 | −369.658 | 0.50 | | | |
| 4 | 84.831 | 7.76 | 1.43875 | 94.94 | S-FPL53 (OHARA) |
| 5 | −488.643 | 0.50 | | | |
| 6 | 69.369 | 5.84 | 1.49700 | 81.54 | S-FPL51 (OHARA) |
| 7 | 278.985 | DA | | | |
| 8 | 124.541 | 1.20 | 1.90366 | 31.31 | TAFD25 (HOYA) |
| 9 | 16.678 | 4.64 | | | |
| 10 | −76.305 | 1.20 | 1.58144 | 40.75 | S-TIL25 (OHARA) |
| 11 | 112.282 | 0.50 | | | |
| 12 | 23.666 | 2.59 | 1.92286 | 18.90 | S-NPH2 (OHARA) |
| 13 | 210.594 | 1.55 | | | |
| 14 | −62.644 | 1.20 | 1.65100 | 56.16 | S-LAL54 (OHARA) |
| 15 | 40.928 | DB | | | |
| 16 | −25.994 | 1.20 | 1.60562 | 43.71 | S-BAM4 (OHARA) |
| 17 | 32.909 | 1.94 | 1.92286 | 18.90 | S-NPH2 (OHARA) |
| 18 | 78.086 | DC | | | |
| 19 | 0.000 | 0.50 | | | Aperture |
| 20 | 0.000 | 0.80 | 1.51633 | 64.14 | S-BSL7 (OHARA) |
| 21 | 0.000 | 0.50 | | | |
| 22 | 15968.756 | 3.01 | 1.49700 | 81.54 | S-FPL51 (OHARA) |
| 23 | −28.638 | 0.50 | | | |
| 24 | 67.715 | 3.23 | 1.49700 | 81.54 | S-FPL51 (OHARA) |
| 25 | −40.576 | 0.50 | | | |
| 26 | 31.655 | 4.33 | 1.49700 | 81.54 | S-FPL51 (OHARA) |
| 27 | −30.003 | 1.20 | 1.83400 | 37.16 | S-LAH60 (OHARA) |
| 28 | 175.368 | 1.25 | | | |
| 29 | 16.877 | 3.07 | 1.49700 | 81.54 | S-FPL51 (OHARA) |
| 30 | 46.081 | 11.49 | | | |
| 31 | 20.838 | 2.10 | 1.72047 | 34.71 | S-NBH8 (OHARA) |
| 32 | 8.912 | 5.44 | | | |
| 33 | 12.096 | 3.48 | 1.49700 | 81.54 | S-FPL51 (OHARA) |
| 34 | −76.518 | 11.11 | | | |
| 35 | 0.000 | 2.70 | 1.49782 | 67.00 | Filter or the like |
| 36 | 0.000 | | | | |

In Example 1, variable amounts of the focal length f of the entire optical system, the f-number F, the half-field angle ω, a variable distance DA between the first lens group G1 and the second lens group G2, a variable distance DB between the second lens group G2 and the third lens group G3, a variable distance DC between the third lens group G3 and the aperture AD, and the like vary as shown in Table 2 along with zooming.

TABLE 2

| | Wide | Mean | Tele |
|---|---|---|---|
| f | 7.72 | 30.00 | 116.38 |
| f-number | 1.85 | 1.85 | 2.33 |
| ω | 24.87 | 6.44 | 1.67 |
| DA | 1.5058 | 46.2454 | 67.5138 |
| DB | 68.7390 | 19.5171 | 3.5886 |
| DC | 1.8427 | 6.3371 | 0.9995 |

In a case of Example 1, values corresponding to the above Conditional Expressions (1) to (9) are as shown in Table 3, and each satisfies the above Conditional Expressions (1) to (9).

TABLE 3

| Conditional Expression(1) | $n_d$ | 1.43875 S-FPL53 |
|---|---|---|
| Conditional Expression(2) | $v_d$ | 94.94 |
| Conditional Expression(3) | $P_{g,F} - (-0.001802 \times v_d + 0.6483)$ | 0.057 |
| Conditional Expression(1) | $n_d$ | 1.49700 S-FPL51 |
| Conditional Expression(2) | $v_d$ | 81.54 |
| Conditional Expression(3) | $P_{g,F} - (-0.001802 \times v_d + 0.6483)$ | 0.036 |
| Conditional Expression(4) | f13/f14 | 0.90 |
| Conditional Expression(5) | $n_d$ | 1.83481 |
| Conditional Expression(6) | $v_d$ | 42.72 |
| Conditional Expression(7) | D4a/D4 | 0.29 |
| Conditional Expression(8) | f1/ft | 0.84 |
| Conditional Expression(9) | f4/ft | 0.22 |

Figure 2:
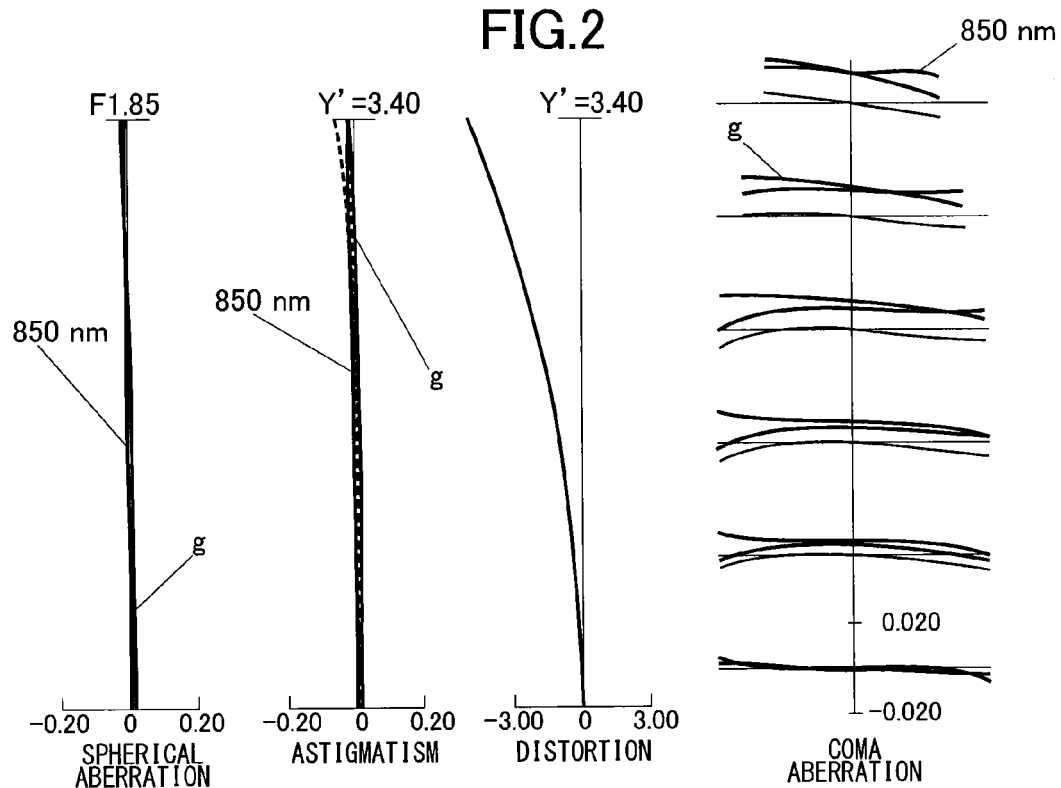
FIG. 2 shows aberration curve diagrams of spherical aberration, astigmatism, distortion, and coma aberration at a short focal length end (wide-angle end) of the zoom lens according to Example 1 of the present invention shown in FIG. 1A.
Figure 3:
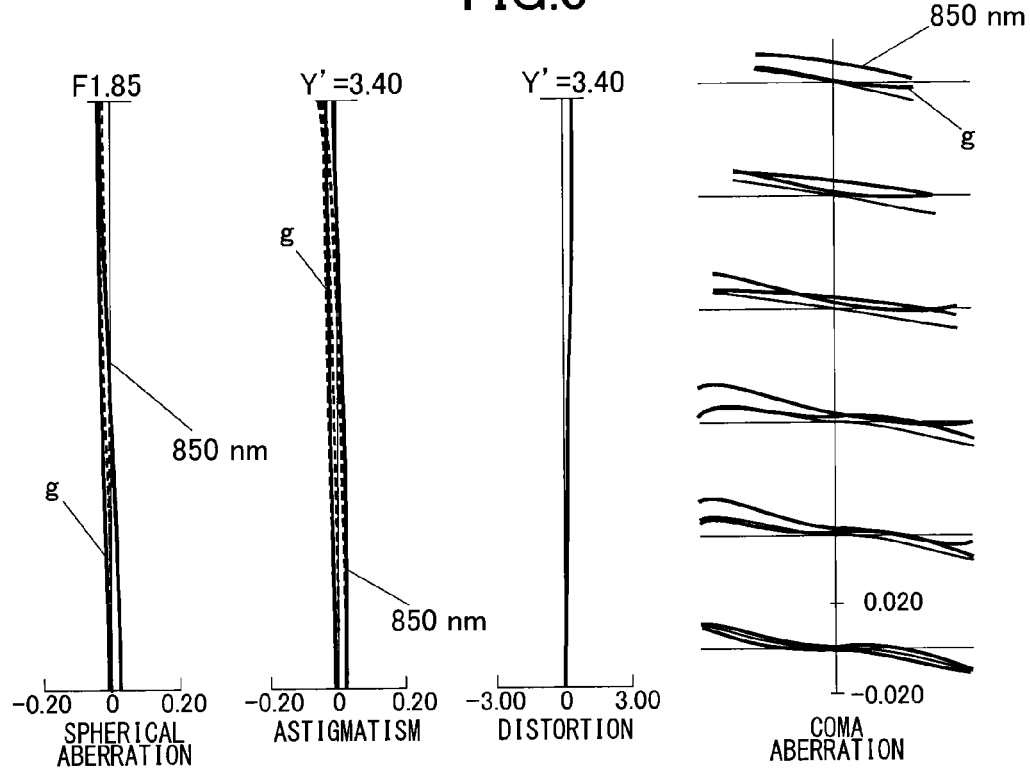
FIG. 3 shows aberration curve diagrams of spherical aberration, astigmatism, distortion, and coma aberration at a mean focal length of the zoom lens according to Example 1 of the present invention shown in FIG. 1B.
Figure 4:
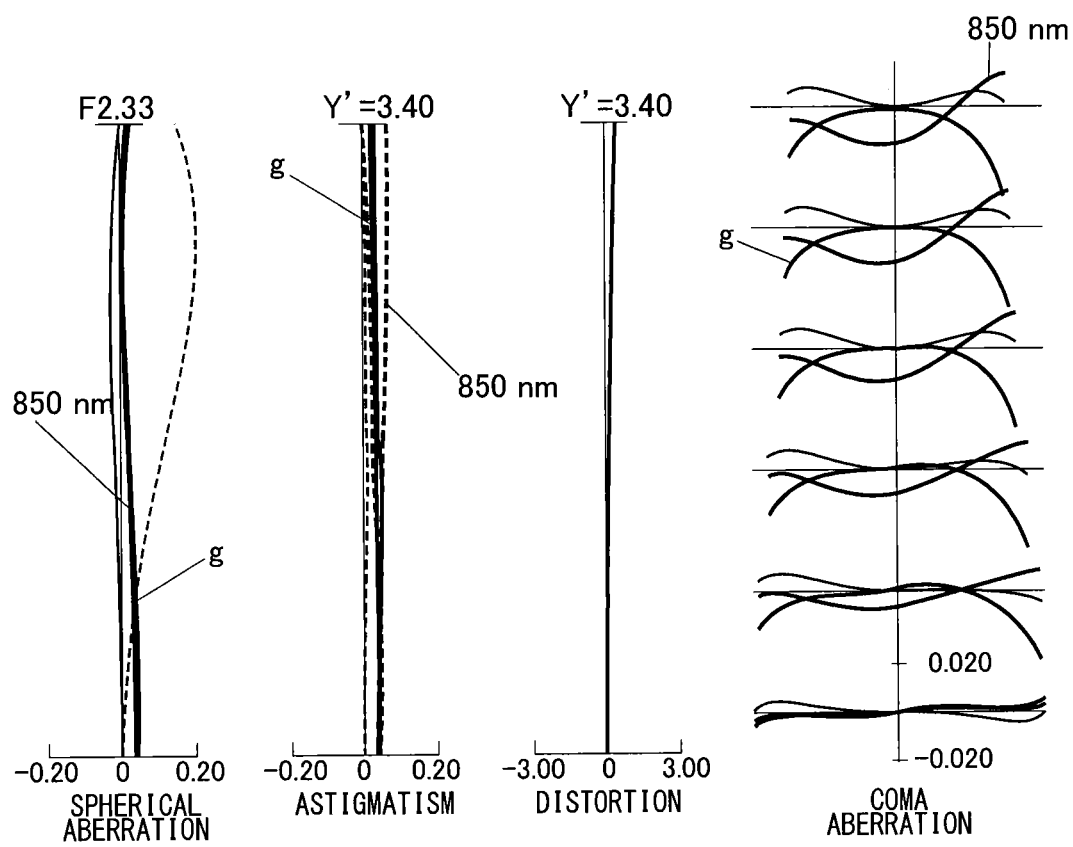
FIG. 4 shows aberration curve diagrams of spherical aberration, astigmatism, distortion, and coma aberration at a long focal length end (telephoto end) of the zoom lens according to Example 1 of the present invention shown in FIG. 1C.

Additionally, in each of FIGS. 2, 3, and 4, aberration diagrams of spherical aberration, astigmatism, distortion, and coma aberration at each of the short focal length end (wide-angle end), the mean focal length, and the long focal length end (telephoto end) of Example 1 are shown. Please note that in the aberration diagrams, a dashed line in a spherical aberration diagram expresses a sine condition, a solid line and a dashed line in an astigmatism diagram express aberration in a sagittal image plane and aberration in a meridional image plane, respectively. The same are true in other Examples.

As is clear from FIGS. 2 to 4, in the zoom lens of Example 1, aberrations are sufficiently corrected. It is possible to correspond to a 1 mega-pixel to 5 mega-pixel light-receiving element. And therefore, it is obvious that structuring the zoom lens as in Example 1 makes it possible to achieve sufficient miniaturization, and ensure extremely favorable image performance.

Second Embodiment

EXAMPLE 2

Figure 5A:
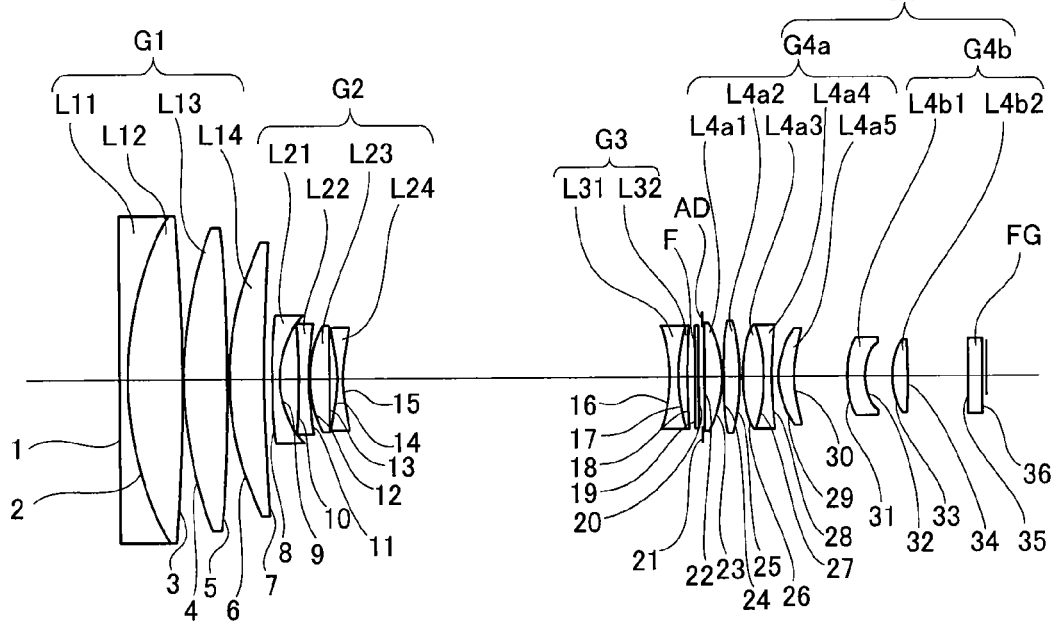
FIGS. 5A, 5B, and 5C are cross-sectional views of the optical system of the zoom lens along an optical axis at a short focal length end (wide-angle end), a mean focal length, and a long focal length end (telephoto end), respectively.
Figure 5B:
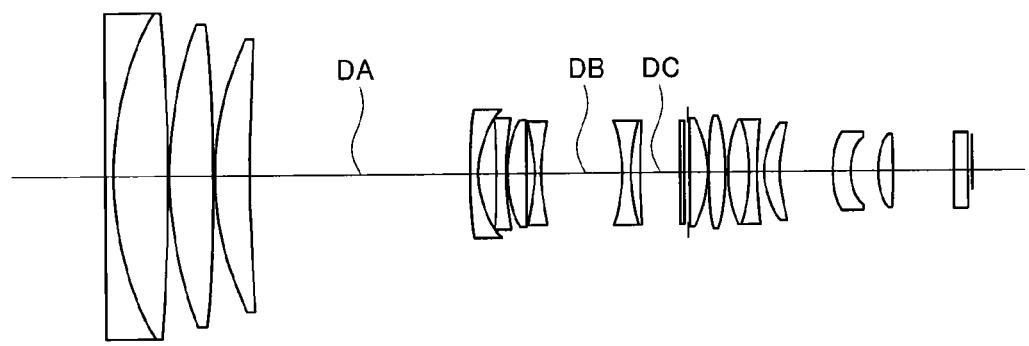
Figure 5C:
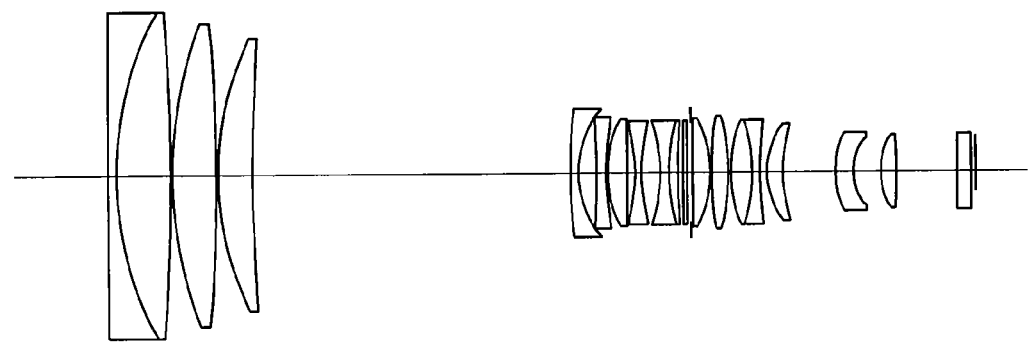

FIGS. 5A to 5C show a lens structure of an optical system of a zoom lens of Example 2 according to the second embodiment of the present invention, and a zoom trajectory associated with zooming from a short focal length end, that is, a wide-angle end (Wide) to a long focal length end, that is, telephoto end (Tele) via a predetermined mean focal length (Mean). FIG. 5A is a cross-sectional view at the short focal length end, that is, at the wide-angle end, FIG. 5B is a cross-sectional view at the predetermined mean focal length, and FIG. 5C is a cross-sectional view at the long focal length end, that is, at the telephoto end. Please note that in FIGS. 5A to 5C which show arrangement of lens groups of Example 2, the left side in the drawing is an object (photographic subject) side, and the right side in the drawing is an image side.

The zoom lens shown in FIGS. 5A to 5C includes, in order from the object side to an image side, a first lens group G1 with a positive refractive power, a second lens group G2 with a negative refractive power, a third lens group G3 with a negative refractive power, and a fourth lens group G4 with a positive refractive power.

The fourth lens group G4 includes a lens group G4a arranged on the object side (lens group arranged on the object side of the fourth lens group) and a lens group G4b arranged on the image side (lens group arranged on the image side of the fourth lens group) with a largest distance in the fourth lens group G4 between them.

Each of the first to fourth lens groups G1 to G4 is held by a holding frame or the like which is suitably common per lens group, and when performing zooming or the like, the second lens group G2 and the third lens group G3 operate integrally per lens group, and an aperture AD is provided integrally with the fourth lens group G4.

In a case of Example 2, unlike the case of Example 1, the aperture AD is arranged on the image side of a filter F of various kinds.

When varying magnification from the short focal length end (wide-angle end) to the long focal length end (telephoto end), the first lens group G1 is fixed, the second lens group G2 is moved to the image side, the third lens group G3 is moved, and the fourth lens group G4 is fixed. Accordingly, the zoom lens moves such that a distance between the first lens group G1 and the second lens group G2 becomes large, and a distance between the second lens group G2 and the third lens group G3 becomes small.

The first lens group G1 of the zoom lens of Example (numerical value example) 2 which is the second embodiment according to the present invention shown in FIGS. 5A to 5C includes, in order from the object side to the image side, a negative lens L11 constituted of a negative meniscus lens having a concave surface on the image side, a positive lens (first positive lens) L12 constituted of a biconvex lens having a convex surface on the object side which has larger curvature than that on the image side, a positive lens (second positive lens) L13 constituted of a biconvex lens having a convex surface on the object side which has larger curvature than that on the image side, and a positive lens (third positive lens) L14 constituted of a positive meniscus lens having a convex surface on the object side.

Two lenses of the negative lens L11 and the positive lens L12 of the first lens group G1 are closely in contact with each other and cemented integrally, and form a cemented lens of the two lenses.

The second lens group G2 includes, in order from the object side to the image side, a negative lens L21 constituted of a negative meniscus lens having a concave surface on the image side, a negative lens L22 constituted of a biconcave lens having a concave surface on the image side which has larger curvature than that on the object side, a positive lens L23 constituted of a positive biconvex lens having a convex surface on the object side which has larger curvature than that on the image side, and a negative lens L24 constituted of a biconcave lens having a concave surface on the object side which has larger curvature than that on the image side.

The third lens group G3 includes, in order from the object side to the image side, a negative lens L31 constituted of a biconcave lens having a concave surface on the object side which has larger curvature than that on the image side, and a positive lens L32 constituted of a positive meniscus lens having a convex surface on the object side.

Two lenses of the negative lens L31 and the positive lens L32 of the third lens group G3 are closely in contact with each other and cemented integrally, and form a cemented lens of the two lenses.

Between the third lens group G3 and the fourth lens group G4, the aperture AD and a filter F of various kinds such as an ND filter or the like constituted of a parallel plate and arranged adjacent to the aperture AD are inserted, and held integrally with the fourth lens group G4.

As described above, the fourth lens group G4 includes the lens group G4a arranged on the object side and the lens group G4b arranged on the image side with the largest distance in the fourth lens group G4 between them.

The lens group G4a arranged on the object side of the fourth lens group G4 includes, in order from the object side to the image side, a positive lens L4a1 constituted of a biconvex lens having a convex surface on the image side which has larger curvature than that on the object side, a positive lens L4a2 constituted of a biconvex lens having a convex surface on the image side which has larger curvature than that on the object side, a positive lens L4a3 constituted of a biconvex lens having a convex surface on the object side which has larger curvature than that on the image side, a negative lens L4a4 constituted of a biconcave lens having a concave surface on the object side which has larger curvature than that on the image side, and a positive lens L4a5 constituted of a positive meniscus lens having a convex surface on the object side.

The positive lens L4a3 and the negative lens L4a4 of the lens group G4a are closely in contact with each other and cemented integrally, and form a cemented lens of two lenses.

The lens group G4b arranged on the image side of the fourth lens group G4 includes, in order from the object side to the image side, a negative lens L4b1 constituted of a negative meniscus lens having a concave surface on the image side, and a positive lens L4b2 constituted of a biconvex lens having a convex surface on the object side which has larger curvature than that on the image side.

On the image side of the lens group G4b, a filter or the like FG is arranged, which is envisaged to be an optical filter of various kinds such as an optical low-pass filter, an infrared-cut filter, or the like, or a cover glass (seal glass) of a light-receiving image sensor such as a CMOS image sensor, a CCD image sensor, or the like, and, here, shown as an equivalent transparent parallel plate.

In this case, as shown in FIGS. 5A to 5C, when varying magnification from the short focal length end to the long focal length end, the first lens group G1 is fixed, the second lens group G2 is moved to the image side, the third lens group G3 is moved, and the fourth lens group G4 is fixed. And therefore, the distance between the lens group G1 and the second lens group G2 becomes large, and the distance between the second lens group G2 and the third lens group G3 becomes small.

In Example 2, a focal length f of an entire optical system, an f-number F, and a half-field angle ω vary in rages of f=7.72-30.01-116.43, F=1.84-1.84-2.31, and ω=24.83-6.40-1.65, respectively, by zooming from the short focal length end to the long focal length end. An optical characteristic of each optical element is shown in Table 4.

TABLE 4

|   | R | D | $n_d$ | $v_d$ | Glass |
|---|---|---|---|---|---|
| 1 | 2755.385 | 1.50 | 1.83481 | 42.72 | S-LAH55V(OHARA) |
| 2 | 65.124 | 10.22 | 1.61800 | 63.33 | S-PHM52(OHARA) |
| 3 | −390.892 | 0.50 | | | |
| 4 | 81.069 | 8.21 | 1.43875 | 94.94 | S-FPL53(OHARA) |
| 5 | −347.095 | 0.50 | | | |
| 6 | 60.658 | 6.34 | 1.43875 | 94.94 | S-FPL53(OHARA) |
| 7 | 270.216 | DA | | | |
| 8 | 104.691 | 1.50 | 1.90366 | 31.31 | TAFD25(HOYA) |
| 9 | 18.314 | 3.84 | | | |

TABLE 4-continued

| | R | D | $n_d$ | $v_d$ | Glass |
|---|---|---|---|---|---|
| 10 | −121.299 | 1.50 | 1.71300 | 53.87 | S-LAL8(OHARA) |
| 11 | 40.913 | 0.50 | | | |
| 12 | 25.226 | 3.51 | 1.92286 | 18.90 | S-NPH2(OHARA) |
| 13 | −434.161 | 1.81 | | | |
| 14 | −30.411 | 1.50 | 1.65100 | 56.16 | S-LAL54(OHARA) |
| 15 | 71.954 | DB | | | |
| 16 | −26.109 | 1.50 | 1.53172 | 48.84 | S-TIL6(OHARA) |
| 17 | 38.776 | 1.75 | 1.92286 | 18.90 | S-NPH2(OHARA) |
| 18 | 80.811 | DC | | | |
| 19 | 0.000 | 0.80 | 1.51633 | 64.14 | S-BSL7(OHARA) |
| 20 | 0.000 | 0.50 | | | |
| 21 | 0.000 | 0.50 | | | Aperture |
| 22 | 547.592 | 3.08 | 1.49700 | 81.54 | S-FPL51(OHARA) |
| 23 | −27.249 | 0.50 | | | |
| 24 | 87.634 | 2.82 | 1.49700 | 81.54 | S-FPL51(OHARA) |
| 25 | −43.831 | 0.50 | | | |
| 26 | 28.785 | 4.21 | 1.49700 | 81.54 | S-FPL51(OHARA) |
| 27 | −29.707 | 1.50 | 1.83400 | 37.16 | S-LAH60(OHARA) |
| 28 | 112.292 | 1.36 | | | |
| 29 | 16.508 | 3.16 | 1.43875 | 94.94 | S-FPL53(OHARA) |
| 30 | 46.203 | 9.92 | | | |
| 31 | 18.960 | 3.13 | 1.72047 | 34.71 | S-NBH8(OHARA) |
| 32 | 9.500 | 5.34 | | | |
| 33 | 14.050 | 3.19 | 1.48749 | 70.24 | S-FSL5(OHARA) |
| 34 | −55.232 | 11.11 | | | |
| 35 | 0.000 | 2.70 | 1.49782 | 67.00 | Filter or the like |
| 36 | 0.000 | | | | |

In Example 2, variable amounts of the focal length f of the entire optical system, the f-number F, the half-field angle ω, a variable distance DA between the first lens group G1 and the second lens group G2, a variable distance DB between the second lens group G2 and the third lens group G3, a variable distance DC between the third lens group G3 and the filter F of various kinds, and the like vary as shown in Table 5 along with zooming.

TABLE 5

| | Wide | Mean | Tele |
|---|---|---|---|
| f | 7.72 | 30.01 | 116.43 |
| f-number | 1.84 | 1.84 | 2.31 |
| ω | 24.83 | 6.40 | 1.65 |
| DA | 1.5000 | 41.8992 | 60.7721 |
| DB | 62.0850 | 15.3473 | 3.2430 |
| DC | 1.4301 | 7.7685 | 1.0000 |

In a case of Example 2, values corresponding to the above Conditional Expressions (1) to (9) are as shown in Table 6, and each satisfies the above Conditional Expressions (1) to (9).

TABLE 6

| Conditional Expression(1) | $n_d$ | 1.43875 | S-FPL53 |
|---|---|---|---|
| Conditional Expression(2) | $v_d$ | 94.94 | |
| Conditional Expression(3) | $P_{g,F} − (−0.001802 \times v_d + 0.6483)$ | 0.057 | |
| Conditional Expression(1) | $n_d$ | 1.49700 | S-FPL51 |
| Conditional Expression(2) | $v_d$ | 81.54 | |
| Conditional Expression(3) | $P_{g,F} − (−0.001802 \times v_d + 0.6483)$ | 0.036 | |
| Conditional Expression(4) | f13/f14 | 0.85 | |
| Conditional Expression(5) | $n_d$ | 1.83481 | |
| Conditional Expression(6) | $v_d$ | 42.72 | |
| Conditional Expression(7) | D4a/D4 | 0.26 | |
| Conditional Expression(8) | f1/ft | 0.78 | |
| Conditional Expression(9) | f4/ft | 0.21 | |

Figure 8:
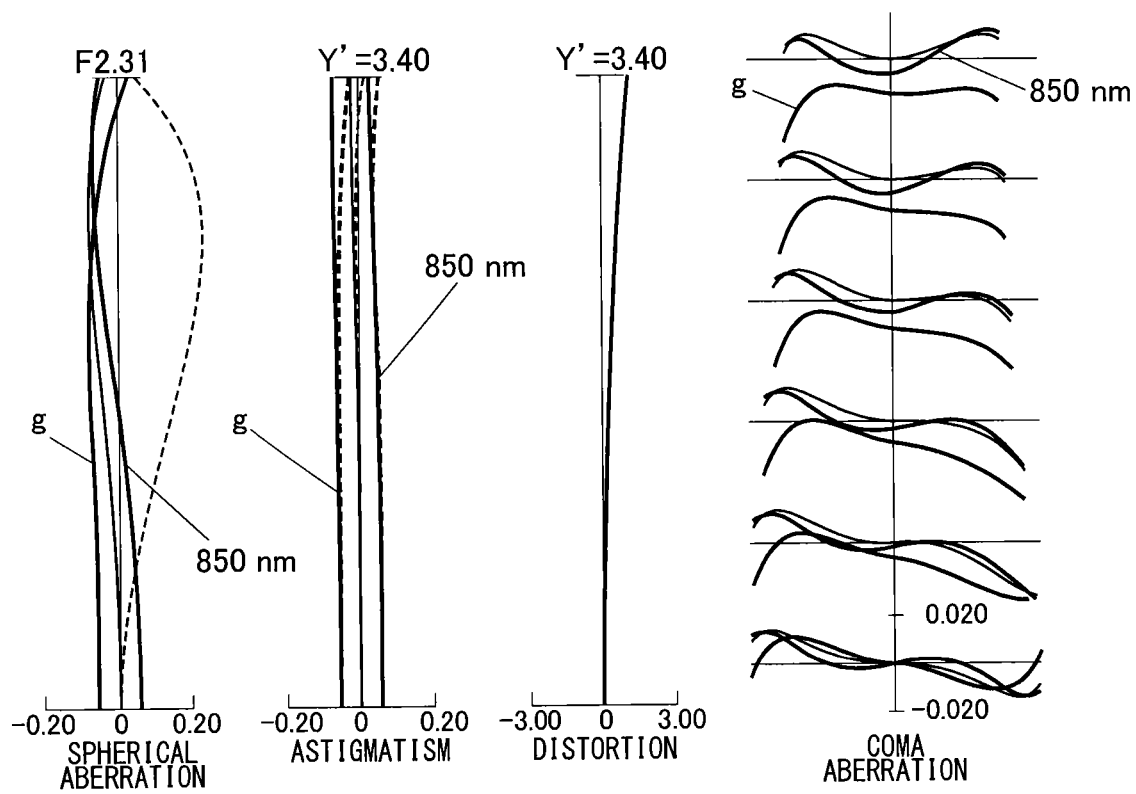
FIG. 8 shows aberration curve diagrams of spherical aberration, astigmatism, distortion, and coma aberration at the long focal length end of the zoom lens according to Example 2 of the present invention shown in FIG. 5C.

Additionally, in each of FIGS. 6, 7, and 8, aberration diagrams of spherical aberration, astigmatism, distortion, and coma aberration at each of the short focal length end (wide-angle end), the mean focal length, and the long focal length end (telephoto end) of Example 2 are shown. Please note that in the aberration diagrams, a dashed line in a spherical aberration diagram expresses a sine condition, a solid line and a dashed line in an astigmatism diagram express aberration in a sagittal image plane and aberration in a meridional image plane, respectively. The same are true in other Examples.

As is clear from FIGS. 6 to 8, in the zoom lens of Example 2 aberrations are sufficiently corrected. It is possible to correspond to a 1 mega-pixel to 5 mega-pixel light-receiving element. And therefore, it is obvious that structuring the zoom lens as in Example 2 makes it possible to achieve sufficient miniaturization, and ensure extremely favorable image performance.

Third Embodiment

EXAMPLE 3

Figure 9A:
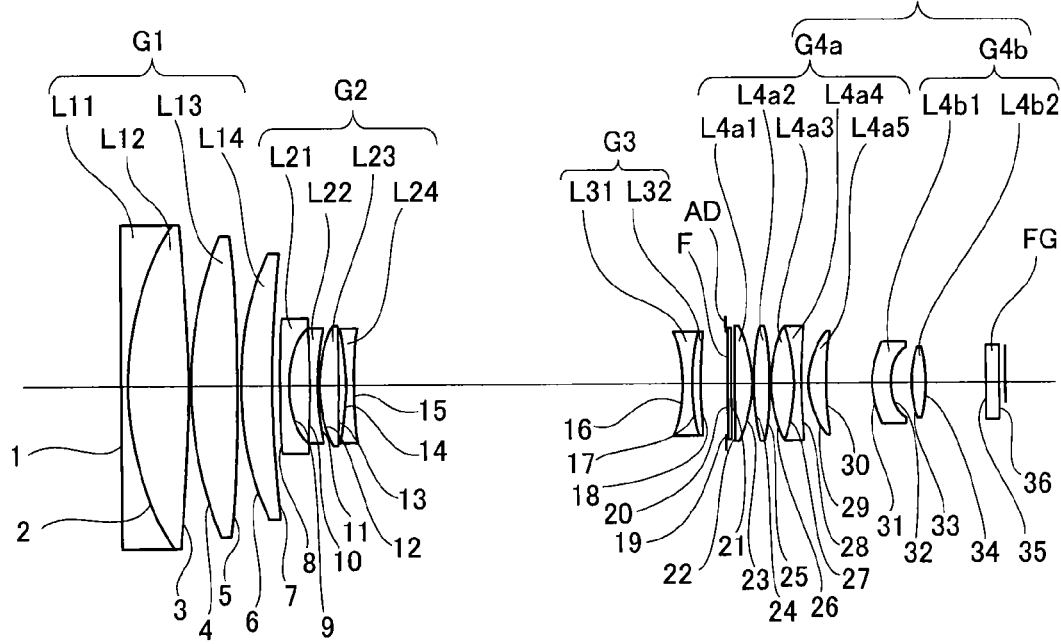
FIGS. 9A, 9B, and 9C are cross-sectional views of the optical system of the zoom lens along an optical axis at a short focal length end (wide-angle end), a mean focal length, and a long focal length end (telephoto end), respectively.
Figure 9B:
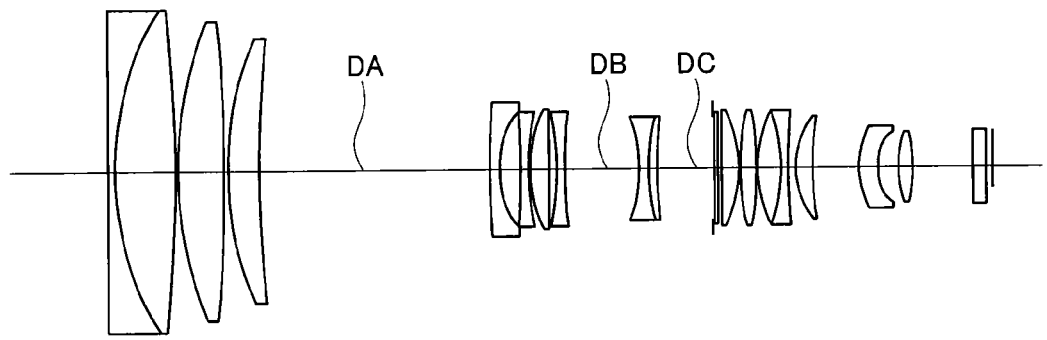
Figure 9C:
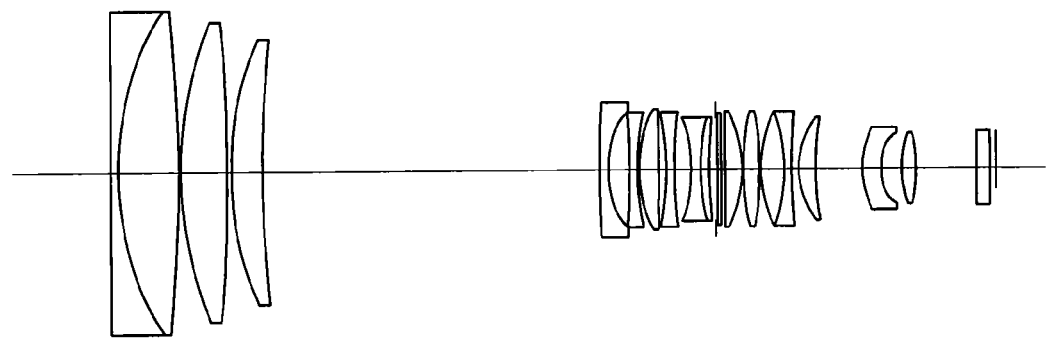

FIGS. 9A to 9C show a lens structure of an optical system of a zoom lens of Example 3 according to the third embodiment of the present invention, and a zoom trajectory associated with zooming from a short focal length end, that is, a wide-angle end (Wide) to a long focal length end, that is, telephoto end (Tele) via a predetermined mean focal length (Mean). FIG. 9A is a cross-sectional view at the short focal length end, that is, at the wide-angle end, FIG. 9B is a cross-sectional view at the predetermined mean focal length, and FIG. 9C is a cross-sectional view at the long focal length end, that is, at the telephoto end. Please note that in FIGS. 9A to 9C which show arrangement of lens groups of Example 3, the left side in the drawing is an object (photographic subject) side, and the right side in the drawing is an image side.

The zoom lens shown in FIGS. 9A to 9C includes, in order from the object side to an image side, a first lens group G1 with a positive refractive power, a second lens group G2 with a negative refractive power, a third lens group G3 with a negative refractive power, and a fourth lens group G4 with a positive refractive power.

The fourth lens group G4 includes a lens group G4a arranged on the object side (lens group arranged on the object side of the fourth lens group) and a lens group G4b arranged on the image side (lens group arranged on the image side of the fourth lens group) with a largest distance in the fourth lens group G4 between them.

Each of the first to fourth lens groups G1 to G4 is held by a holding frame or the like which is suitably common per lens group, and when performing zooming or the like, at least the second lens group G2 and the third lens group G3 operate integrally per lens group, and an aperture AD and a filter F of various kinds are provided integrally with the fourth lens group G4.

When varying magnification from the short focal length end (wide-angle end) to the long focal length end (telephoto end), the first lens group G1 is fixed, the second lens group G2 is moved to the image side, the third lens group G3 is moved, and the fourth lens group G4 is fixed. Accordingly, the zoom lens moves such that a distance between the first lens group G1 and the second lens group G2 becomes large, and a distance between the second lens group G2 and the third lens group G3 becomes small.

The first lens group G1 of the zoom lens of Example (numerical value example) 3 which is the third embodiment according to the present invention shown in FIGS. 9A to 9C includes, in order from the object side to the image side, a negative lens L11 constituted of a biconcave lens having a concave surface on the image side which has larger curvature than that on the object side, a positive lens (first positive lens) L12 constituted of a biconvex lens having a convex surface on the object side which has larger curvature than that on the image side, a positive lens (second positive lens) L13 constituted of a biconvex lens having a convex surface on the object side which has larger curvature than that on the image side, and a positive lens (third positive lens) L14 constituted of a positive meniscus lens having a convex surface on the object side.

Two lenses of the negative lens L11 and the positive lens L12 of the first lens group G1 are closely in contact with each other and cemented integrally, and form a cemented lens of the two lenses.

The second lens group G2 includes, in order from the object side to the image side, a negative lens L21 constituted of a negative meniscus lens having a concave surface on the image side, a negative lens L22 constituted of a biconcave lens having a concave surface on the image side which has larger curvature than that on the object side, a positive lens L23 constituted of a biconvex lens having a convex surface on the object side which has larger curvature than that on the image side, and a negative lens L24 constituted of a biconcave lens having a concave surface on the object side which has larger curvature than that on the image side.

The third lens group G3 includes, in order from the object side to the image side, a negative lens L31 constituted of a biconcave lens having a concave surface on the object side which has larger curvature than that on the image side, and a positive lens L32 constituted of a positive meniscus lens having a convex surface on the object side.

Two lenses of the negative lens L31 and the positive lens L32 of the third lens group G3 are closely in contact with each other and cemented integrally, and form a cemented lens of the two lenses.

Between the third lens group G3 and the fourth lens group G4, the aperture AD and the filter F of various kinds such as an ND filter or the like constituted of a parallel plate and arranged adjacent to the aperture AD are inserted, and held integrally with the fourth lens group G4.

As described above, the fourth lens group G4 includes the lens group G4a arranged on the object side and the lens group G4b arranged on the image side with the largest distance in the fourth lens group G4 between them.

The lens group G4a arranged on the object side of the fourth lens group G4 includes, in order from the object side to the image side, a positive lens L4a1 constituted of a biconvex lens having a convex surface on the image side which has larger curvature than that on the object side, a positive lens L4a2 constituted of a biconvex lens having a convex surface on the object side which has larger curvature than that on the image side, a positive lens L4a3 constituted of a biconvex lens having a convex surface on the image side which has larger curvature than that on the object side, a negative lens L4a4 constituted of a biconcave lens having a concave surface on the object side which has larger curvature than that on the image side, and a positive lens L4a5 constituted of a positive meniscus lens having a convex surface on the object side.

The positive lens L4a3 and the negative lens L4a4 of the lens group G4a are closely in contact with each other and cemented integrally, and form a cemented lens of two lenses.

The lens group G4b arranged on the image side of the fourth lens group G4 includes, in order from the object side to the image side, a negative lens L4b1 constituted of a negative meniscus lens having a concave surface on the image side, and a positive lens L4b2 constituted of a biconvex lens having a convex surface on the object side which has larger curvature than that on the image side.

On the image side of the lens group G4b, a filter or the like FG is arranged, which is envisaged to be an optical filter of various kinds such as an optical low-pass filter, an infrared-cut filter, or the like, or a cover glass (seal glass) of a light-receiving image sensor such as a CMOS image sensor, a CCD image sensor, or the like, and, here, shown as an equivalent transparent parallel plate.

In this case, as shown in FIGS. 9A to 9C, when varying magnification from the short focal length end to the long focal length end, the first lens group G1 is fixed, the second lens group G2 is moved to the image side, the third lens group G3 is moved, and the fourth lens group G4 is fixed. And therefore, the distance between the lens group G1 and the second lens group G2 becomes large, and the distance between the second lens group G2 and the third lens group G3 becomes small.

Focusing is preferably performed by the first lens group G1.

This is because, in a case where focusing is performed by the first lens group G1, there is an advantage in that a position of the first lens group G1 as a focus group becomes the same at any position in the zoom range.

In Example 3, a focal length f of an entire optical system, an f-number F, and a half-field angle ω vary in rages of f=7.72-29.99-116.38, F=1.80-1.80-2.42, and ω=24.54-6.36-1.64, respectively, by zooming from the short focal length end to the long focal length end. An optical characteristic of each optical element is shown in Table 7.

TABLE 7

|  | R | D | $n_d$ | $v_d$ | Glass |
|---|---|---|---|---|---|
| 1 | −1306.363 | 1.50 | 1.81600 | 46.62 | S-LAH59(OHARA) |
| 2 | 58.982 | 10.92 | 1.60300 | 65.44 | S-PHM53(OHARA) |
| 3 | −312.631 | 0.50 |  |  |  |
| 4 | 73.414 | 8.98 | 1.43875 | 94.94 | S-FPL53(OHARA) |
| 5 | −248.332 | 0.50 |  |  |  |
| 6 | 63.005 | 5.82 | 1.43875 | 94.94 | S-FPL53(OHARA) |
| 7 | 238.282 | DA |  |  |  |
| 8 | 187.445 | 1.50 | 1.90366 | 31.31 | TAFD25(HOYA) |
| 9 | 17.209 | 4.05 |  |  |  |
| 10 | −111.857 | 1.50 | 1.71300 | 53.87 | S-LAL8(OHARA) |
| 11 | 58.598 | 0.50 |  |  |  |
| 12 | 26.872 | 3.49 | 1.92286 | 18.90 | S-NPH2(OHARA) |
| 13 | −617.733 | 1.38 |  |  |  |
| 14 | −48.744 | 1.50 | 1.65100 | 56.16 | S-LAL54(OHARA) |
| 15 | 80.507 | DB |  |  |  |
| 16 | −25.220 | 1.50 | 1.51742 | 52.43 | S-NSL36(OHARA) |
| 17 | 40.077 | 1.68 | 1.92286 | 18.90 | S-NPH2(OHARA) |
| 18 | 81.584 | DC |  |  |  |
| 19 | 0.000 | 0.50 |  |  | Aperture |
| 20 | 0.000 | 0.80 | 1.51633 | 64.14 | S-BSL7(OHARA) |
| 21 | 0.000 | 0.50 |  |  |  |
| 22 | 355.526 | 3.34 | 1.49700 | 81.54 | S-FPL51(OHARA) |
| 23 | −25.697 | 0.50 |  |  |  |
| 24 | 59.839 | 2.75 | 1.43875 | 94.94 | S-FPL53(OHARA) |
| 25 | −62.483 | 0.50 |  |  |  |
| 26 | 30.174 | 4.22 | 1.49700 | 81.54 | S-FPL51(OHARA) |
| 27 | −28.556 | 1.50 | 1.83400 | 37.16 | S-LAH60(OHARA) |
| 28 | 124.014 | 1.32 |  |  |  |
| 29 | 16.661 | 3.13 | 1.43875 | 94.94 | S-FPL53(OHARA) |
| 30 | 56.477 | 8.77 |  |  |  |
| 31 | 16.873 | 3.51 | 1.72047 | 34.71 | S-NBH8(OHARA) |
| 32 | 9.265 | 3.81 |  |  |  |
| 33 | 21.288 | 2.38 | 1.48749 | 70.24 | S-FSL5(OHARA) |
| 34 | −47.778 | 11.10 |  |  |  |
| 35 | 0.000 | 2.70 | 1.49782 | 67.00 | Filter or the like |
| 36 | 0.000 |  |  |  |  |

In Example 3, variable amounts of the focal length f of the entire optical system, the f-number F, the half-field angle ω, a variable distance DA between the first lens group G1 and the second lens group G2, a variable distance DB between the second lens group G2 and the third lens group G3, a variable distance DC between the third lens group G3 and the aperture AD, and the like vary as shown in Table 8 along with zooming.

TABLE 8

|  | Wide | Mean | Tele |
|---|---|---|---|
| f | 7.72 | 29.99 | 116.38 |
| f-number | 1.80 | 1.80 | 2.42 |
| ω | 24.54 | 6.36 | 1.64 |
| DA | 1.5000 | 43.4336 | 63.0226 |
| DB | 61.4780 | 13.9118 | 3.3433 |
| DC | 4.3866 | 10.0193 | 0.9996 |

In a case of Example 3, values corresponding to the above Conditional Expressions (1) to (9) are as shown in Table 9, and each satisfies the above Conditional Expressions (1) to (9).

TABLE 9

| Conditional Expression(1) | $n_d$ | 1.43875 | S-FPL53 |
|---|---|---|---|
| Conditional Expression(2) | $v_d$ | 94.94 | |
| Conditional Expression(3) | $P_{g,F} - (-0.001802 \times v_d + 0.6483)$ | 0.057 | |
| Conditional Expression(1) | $n_d$ | 1.49700 | S-FPL51 |
| Conditional Expression(2) | $v_d$ | 81.54 | |
| Conditional Expression(3) | $P_{g,F} - (-0.001802 \times v_d + 0.6483)$ | 0.036 | |
| Conditional Expression(4) | f13/f14 | 0.67 | |
| Conditional Expression(5) | $n_d$ | 1.81600 | |
| Conditional Expression(6) | $v_d$ | 46.62 | |
| Conditional Expression(7) | D4a/D4 | 0.25 | |
| Conditional Expression(8) | f1/ft | 0.79 | |
| Conditional Expression(9) | f4/ft | 0.18 | |

Figure 10:
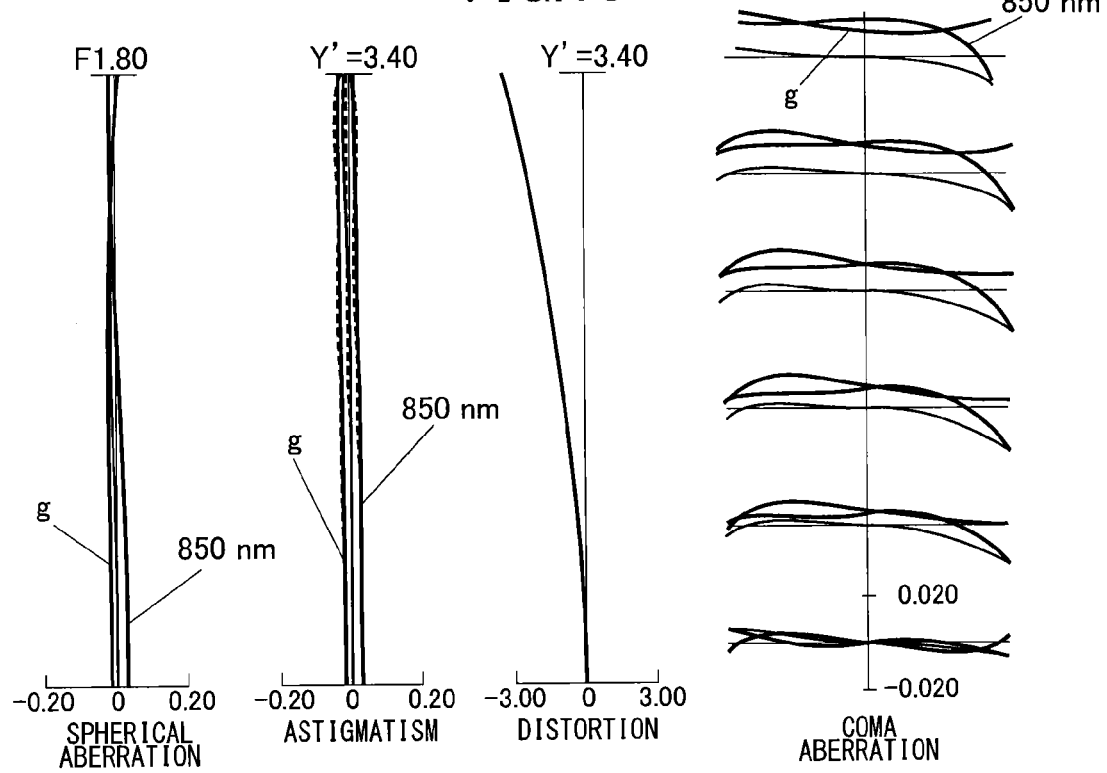
FIG. 10 shows aberration curve diagrams of spherical aberration, astigmatism, distortion, and coma aberration at the short focal length end of the zoom lens according to Example 3 of the present invention shown in FIG. 9A.
Figure 11:
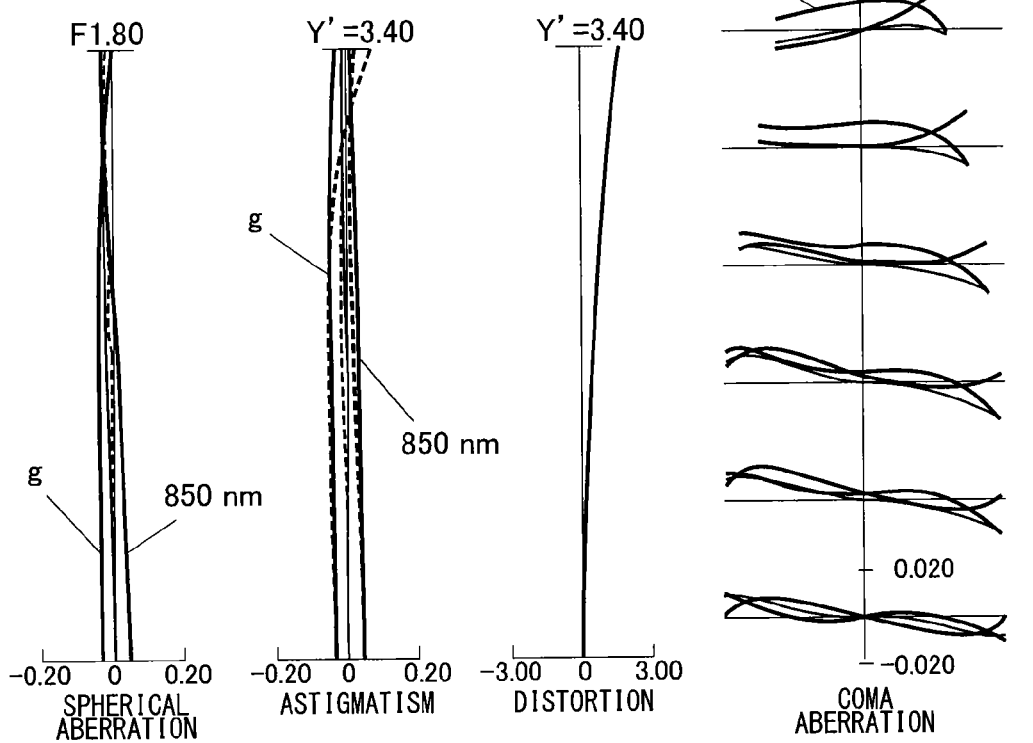
FIG. 11 shows aberration curve diagrams of spherical aberration, astigmatism, distortion, and coma aberration at the mean focal length of the zoom lens according to Example 3 of the present invention shown in FIG. 9B.
Figure 12:
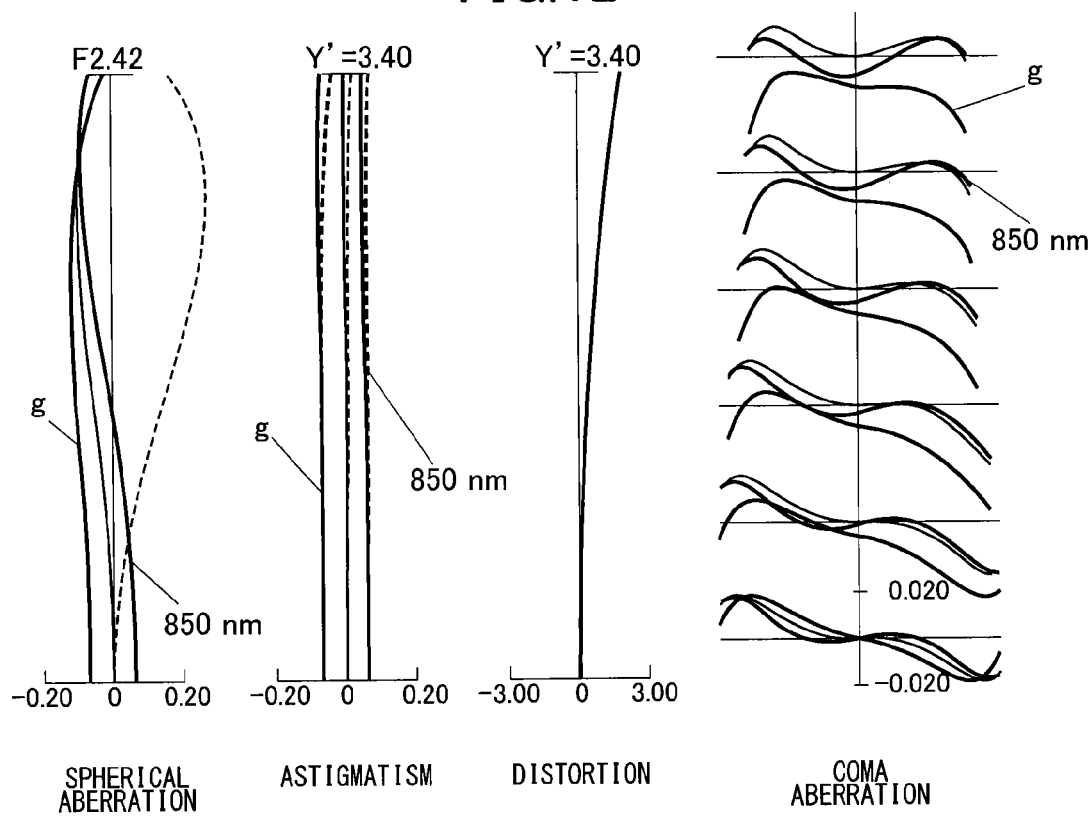
FIG. 12 shows aberration curve diagrams of spherical aberration, astigmatism, distortion, and coma aberration at the long focal length end of the zoom lens according to Example 3 of the present invention shown in FIG. 9C.

Additionally, in each of FIGS. 10, 11, and 12, aberration diagrams of spherical aberration, astigmatism, distortion, and coma aberration at each of the short focal length end (wide-angle end), the mean focal length, and the long focal length end (telephoto end) of Example 3 are shown. Please note that in the aberration diagrams, a dashed line in a spherical aberration diagram expresses a sine condition, a solid line and a dashed line in an astigmatism diagram express aberration in a sagittal image plane and aberration in a meridional image plane, respectively. The same are true in other Examples.

As is clear from FIGS. 10 to 12, in the zoom lens of Example 3, aberrations are sufficiently corrected. It is possible to correspond to a 1 mega-pixel to 5 mega-pixel light-receiving element. And therefore, it is obvious that structuring the zoom lens as in Example 3 makes it possible to achieve sufficient miniaturization, and ensure extremely favorable image performance.

Fourth Embodiment

EXAMPLE 4

Figure 13A:
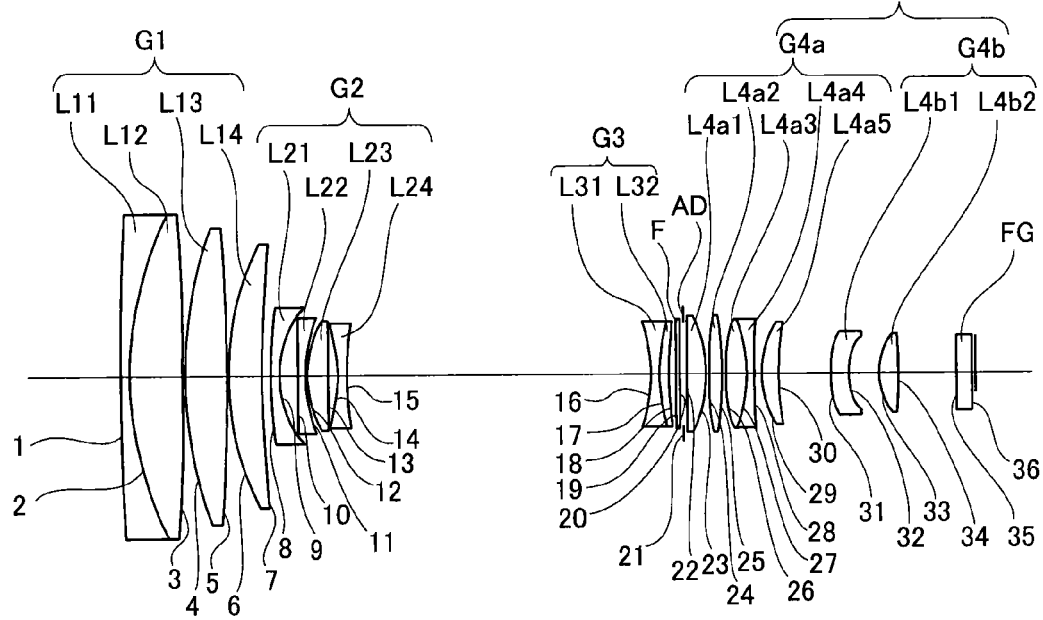
FIGS. 13A, 13B, and 13C are cross-sectional views of the optical system of the zoom lens along an optical axis at a short focal length end (wide-angle end), a mean focal length, and a long focal length end (telephoto end), respectively.
Figure 13B:
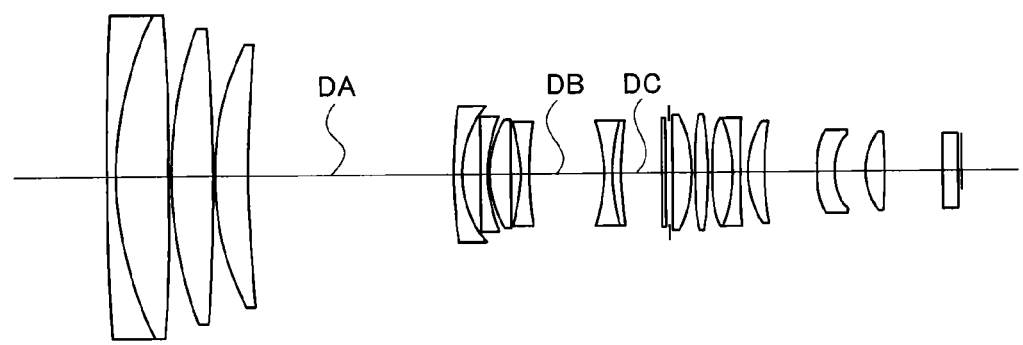
Figure 13C:
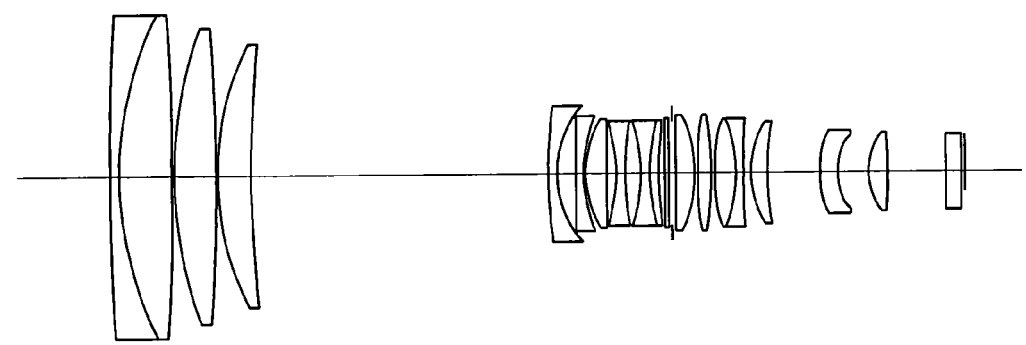

FIGS. 13A to 13C show a lens structure of an optical system of a zoom lens of Example 4 according to the fourth embodiment of the present invention, and a zoom trajectory associated with zooming from a short focal length end, that is, a wide-angle end (Wide) to a long focal length end, that is, telephoto end (Tele) via a predetermined mean focal length (Mean). FIG. 13A is a cross-sectional view at the short focal length end, that is, at the wide-angle end, FIG. 13B is a cross-sectional view at the predetermined mean focal length, and FIG. 13C is a cross-sectional view at the long focal length end, that is, at the telephoto end. Please note that in FIGS. 13A to 13C which show arrangement of lens groups of Example 4, the left side in the drawing is an object (photographic subject) side, and the right side in the drawing is an image side.

The zoom lens shown in FIGS. 13A to 13C includes, in order from the object side to an image side, a first lens group G1 with a positive refractive power, a second lens group G2 with a negative refractive power, a third lens group G3 with a negative refractive power, and a fourth lens group G4 with a positive refractive power.

The fourth lens group G4 includes a lens group G4a arranged on the object side (lens group arranged on the object side of the fourth lens group) and a lens group G4b arranged on the image side (lens group arranged on the image side of the fourth lens group) with a largest distance in the fourth lens group G4 between them.

Each of the first to fourth lens groups G1 to G4 is held by a holding frame or the like which is suitably common per lens group, and when performing zooming, at least the second lens group G2 and the third lens group G3 operate integrally per lens group, and an aperture AD is held integrally by the fourth lens group G4.

When varying magnification from the short focal length end (wide-angle end) to the long focal length end (telephoto end), the first lens group G1 is fixed, the second lens group G2 is moved to the image side, the third lens group G3 is moved, and the fourth lens group G4 is fixed. Accordingly, the zoom lens moves such that a distance between the first lens group G1 and the second lens group G2 becomes large, and a distance between the second lens group G2 and the third lens group G3 becomes small.

The first lens group G1 of the zoom lens of Example (numerical value example) 4 which is the fourth embodiment according to the present invention shown in FIGS. 13A to 13C includes, in order from the object side to the image side, a negative lens L11 constituted of a negative meniscus lens having a concave surface on the image side, a positive lens (first positive lens) L12 constituted of a biconvex lens having a convex surface on the object side which has larger curvature than that on the image side, a positive lens (second positive lens) L13 constituted of a biconvex lens having a convex surface on the object side which has larger curvature than that on the image side, and a positive lens (third positive lens) L14 constituted of a positive meniscus lens having a convex surface on the object side.

Two lenses of the negative lens L11 and the positive lens L12 of the first lens group G1 are closely in contact with each other and cemented integrally, and form a cemented lens of the two lenses.

The second lens group G2 includes, in order from the object side to the image side, a negative lens L21 constituted of a negative meniscus lens having a concave surface on the image side, a negative lens L22 constituted of a biconcave lens having a concave surface on the image side which has larger curvature than that on the object side, a positive lens L23 constituted of a positive meniscus lens having a convex surface on the object side, and a negative lens L24 constituted of a biconcave lens having a concave surface on the object side which has larger curvature than that on the image side.

The third lens group G3 includes, in order from the object side to the image side, a negative lens L31 constituted of a biconcave lens having a concave surface on the object side which has larger curvature than that on the image side, and a positive lens L32 constituted of a positive meniscus lens having a convex surface on the object side.

Two lenses of the negative lens L31 and the positive lens L32 of the third lens group G3 are closely in contact with each other and cemented integrally, and form a cemented lens of the two lenses.

Between the third lens group G3 and the fourth lens group G4, the aperture AD and a filter F of various kinds such as an ND filter or the like constituted of a parallel plate and arranged adjacent to the aperture AD are inserted, and held integrally with the fourth lens group G4.

As described above, the fourth lens group G4 includes the lens group G4a arranged on the object side and the lens group G4b arranged on the image side with the largest distance in the fourth lens group G4 between them.

The lens group G4a arranged on the object side of the fourth lens group G4 includes, in order from the object side to the image side, a positive lens L4a1 constituted of a biconvex lens having a convex surface on the image side which has larger curvature than that on the object side, a positive lens L4a2 constituted of a biconvex lens having a convex surface on the image side which has larger curvature than that on the object side, a positive lens L4a3 constituted of a biconvex lens having a convex surface on the image side which has larger curvature than that on the object side, a negative lens L4a4 constituted of a biconcave lens having a concave surface on the object side which has larger curvature than that on the image side, and a positive lens L4a5 constituted of a positive meniscus lens having a convex surface on the object side.

The positive lens L4a3 and the negative lens L4a4 of the lens group G4a are closely in contact with each other and cemented integrally, and form a cemented lens of two lenses.

The lens group G4b arranged on the image side of the fourth lens group G4 includes, in order from the object side to the image side, a negative lens L4b1 constituted of a negative meniscus lens having a concave surface on the image side, and a positive lens L4b2 constituted of a biconvex lens having a convex surface on the object side which has larger curvature than that on the image side.

On the image side of the lens group G4b, a filter or the like FG is arranged, which is envisaged to be an optical filter of various kinds such as an optical low-pass filter, an infrared-cut filter, or the like, or a cover glass (seal glass) of a light-receiving image sensor such as a CMOS image sensor, a CCD image sensor, or the like, and, here, shown as an equivalent transparent parallel plate.

In this case, as shown in FIGS. 13A to 13C, when varying magnification from the short focal length end to the long focal length end, the first lens group G1 is fixed, the second lens group G2 is moved to the image side, the third lens group G3 is moved, and the fourth lens group G4 is fixed. And therefore, the distance between the lens group G1 and the second lens group G2 becomes large, and the distance between the second lens group G2 and the third lens group G3 becomes small.

Focusing is preferably performed by the first lens group G1.

In Example 4, a focal length f of an entire optical system, an f-number F, and a half-field angle ω vary in rages of f=7.72-29.99-116.37, F=1.83-1.83-2.36, and ω=25.08-6.46-1.66, respectively, by zooming from the short focal length end to the long focal length end. An optical characteristic of each optical element is shown in Table 10.

TABLE 10

| | R | D | $n_d$ | $v_d$ | Glass |
|---|---|---|---|---|---|
| 1 | 624.428 | 1.49 | 1.80440 | 39.59 | S-LAH63(OHARA) |
| 2 | 67.110 | 9.99 | 1.60300 | 65.44 | S-PHM53(OHARA) |

TABLE 10-continued

| | R | D | $n_d$ | $v_d$ | Glass |
|---|---|---|---|---|---|
| 3 | −549.116 | 0.50 | | | |
| 4 | 82.949 | 7.95 | 1.43875 | 94.94 | S-FPL53(OHARA) |
| 5 | −469.282 | 0.50 | | | |
| 6 | 56.552 | 6.52 | 1.43875 | 94.94 | S-FPL53(OHARA) |
| 7 | 212.760 | DA | | | |
| 8 | 84.088 | 1.50 | 1.90366 | 31.31 | TAFD25(HOYA) |
| 9 | 19.009 | 3.56 | | | |
| 10 | −852.817 | 1.50 | 1.71300 | 53.87 | S-LAL8(OHARA) |
| 11 | 27.202 | 0.50 | | | |
| 12 | 21.459 | 3.65 | 1.92286 | 18.90 | S-NPH2(OHARA) |
| 13 | 391.905 | 2.13 | | | |
| 14 | −27.469 | 1.50 | 1.67790 | 55.34 | S-LAL12(OHARA) |
| 15 | 62.406 | DB | | | |
| 16 | −24.606 | 1.50 | 1.51742 | 52.43 | S-NSL36(OHARA) |
| 17 | 37.679 | 1.73 | 1.92286 | 18.90 | S-NPH2(OHARA) |
| 18 | 75.113 | DC | | | |
| 19 | 0.000 | 0.80 | 1.51633 | 64.14 | S-BSL7(OHARA) |
| 20 | 0.000 | 0.50 | | | |
| 21 | 0.000 | 0.89 | | | Aperture |
| 22 | 422.970 | 3.55 | 1.49700 | 81.54 | S-FPL51(OHARA) |
| 23 | −25.264 | 0.50 | | | |
| 24 | 67.778 | 2.72 | 1.43875 | 94.94 | S-FPL53(OHARA) |
| 25 | −54.771 | 0.50 | | | |
| 26 | 32.100 | 4.16 | 1.49700 | 81.54 | S-FPL51(OHARA) |
| 27 | −28.537 | 1.50 | 1.83400 | 37.16 | S-LAH60(OHARA) |
| 28 | 185.880 | 1.23 | | | |
| 29 | 17.232 | 3.37 | 1.43875 | 94.94 | S-FPL53(OHARA) |
| 30 | 58.559 | 9.93 | | | |
| 31 | 18.863 | 3.19 | 1.72047 | 34.71 | S-NBH8(OHARA) |
| 32 | 9.483 | 6.10 | | | |
| 33 | 13.340 | 3.55 | 1.48749 | 70.24 | S-FSL5(OHARA) |
| 34 | −57.498 | 11.10 | | | |
| 35 | 0.000 | 2.70 | 1.49782 | 67.00 | Filter or the like |
| 36 | 0.000 | | | | |

In Example 4, variable amounts of the focal length f of the entire optical system, the f-number F, the half-field angle w, a variable distance DA between the first lens group G1 and the second lens group G2, a variable distance DB between the second lens group G2 and the third lens group G3, a variable distance DC between the third lens group G3 and the fourth lens group G4, and the like vary as shown in Table 11 along with zooming.

TABLE 11

| | Wide | Mean | Tele |
|---|---|---|---|
| f | 7.72 | 29.99 | 116.37 |
| f-number | 1.83 | 1.83 | 2.36 |
| ω | 25.08 | 6.46 | 1.66 |
| DA | 1.5018 | 39.2885 | 56.9863 |
| DB | 58.3388 | 14.3392 | 3.2344 |
| DC | 1.3712 | 7.5889 | 0.9869 |

In a case of Example 4, values corresponding to the above Conditional Expressions (1) to (9) are as shown in Table 12, and each satisfies the above Conditional Expressions (1) to (9).

TABLE 12

| Conditional Expression(1) | $n_d$ | 1.43875 S-FPL53 |
|---|---|---|
| Conditional Expression(2) | $v_d$ | 94.94 |
| Conditional Expression(3) | $P_{g,F} - (-0.001802 \times v_d + 0.6483)$ | 0.057 |
| Conditional Expression(1) | $n_d$ | 1.49700 S-FPL51 |
| Conditional Expression(2) | $v_d$ | 81.54 |
| Conditional Expression(3) | $P_{g,F} - (-0.001802 \times v_d + 0.6483)$ | 0.036 |
| Conditional Expression(4) | f13/f14 | 0.93 |
| Conditional Expression(5) | $n_d$ | 1.80440 |

TABLE 12-continued

| Conditional Expression(6) | $v_d$ | 49.59 |
| Conditional Expression(7) | D4a/D4 | 0.25 |
| Conditional Expression(8) | f1/ft | 0.79 |
| Conditional Expression(9) | f4/ft | 0.23 |

Figure 14:
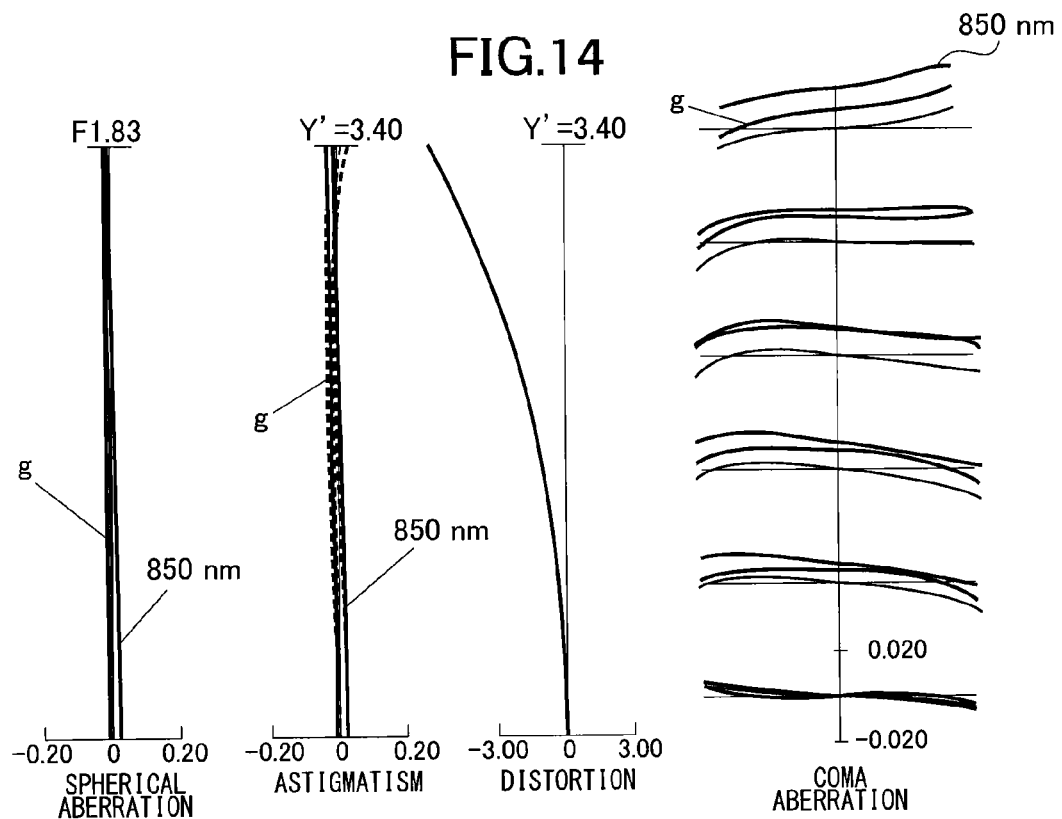
FIG. 14 shows aberration curve diagrams of spherical aberration, astigmatism, distortion, and coma aberration at the short focal length end of the zoom lens according to Example 4 of the present invention shown in FIG. 13A.
Figure 15:
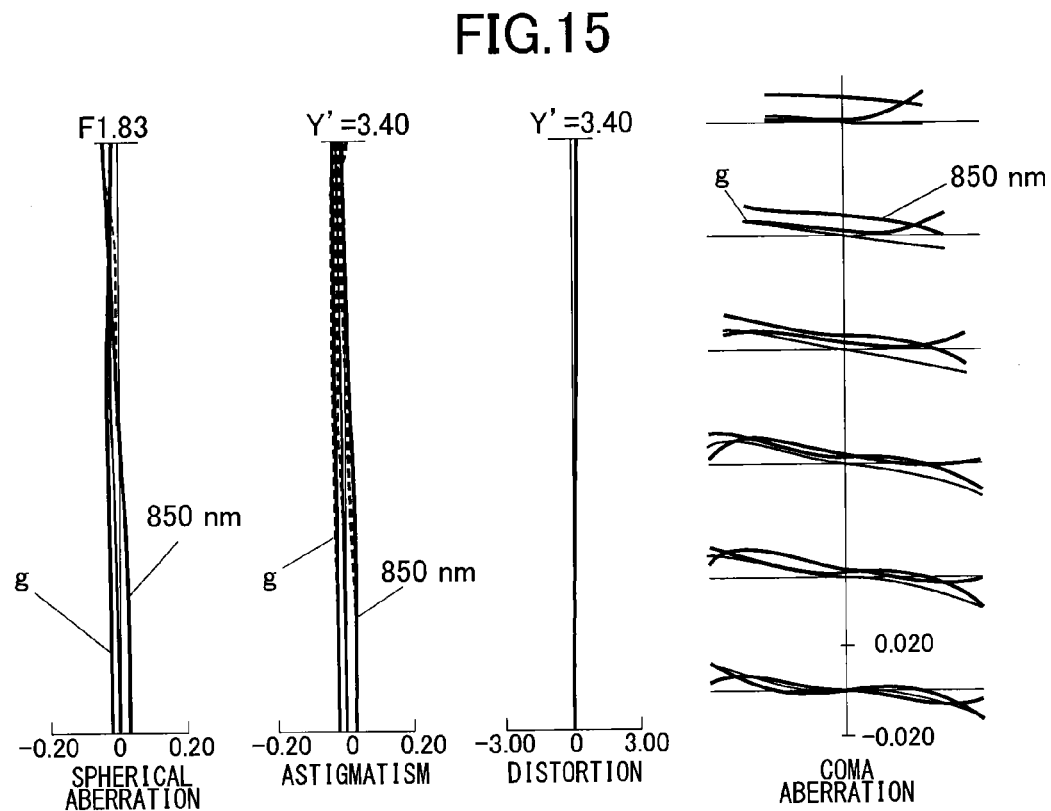
FIG. 15 shows aberration curve diagrams of spherical aberration, astigmatism, distortion, and coma aberration at the mean focal length of the zoom lens according to Example 4 of the present invention shown in FIG. 13B.
Figure 16:
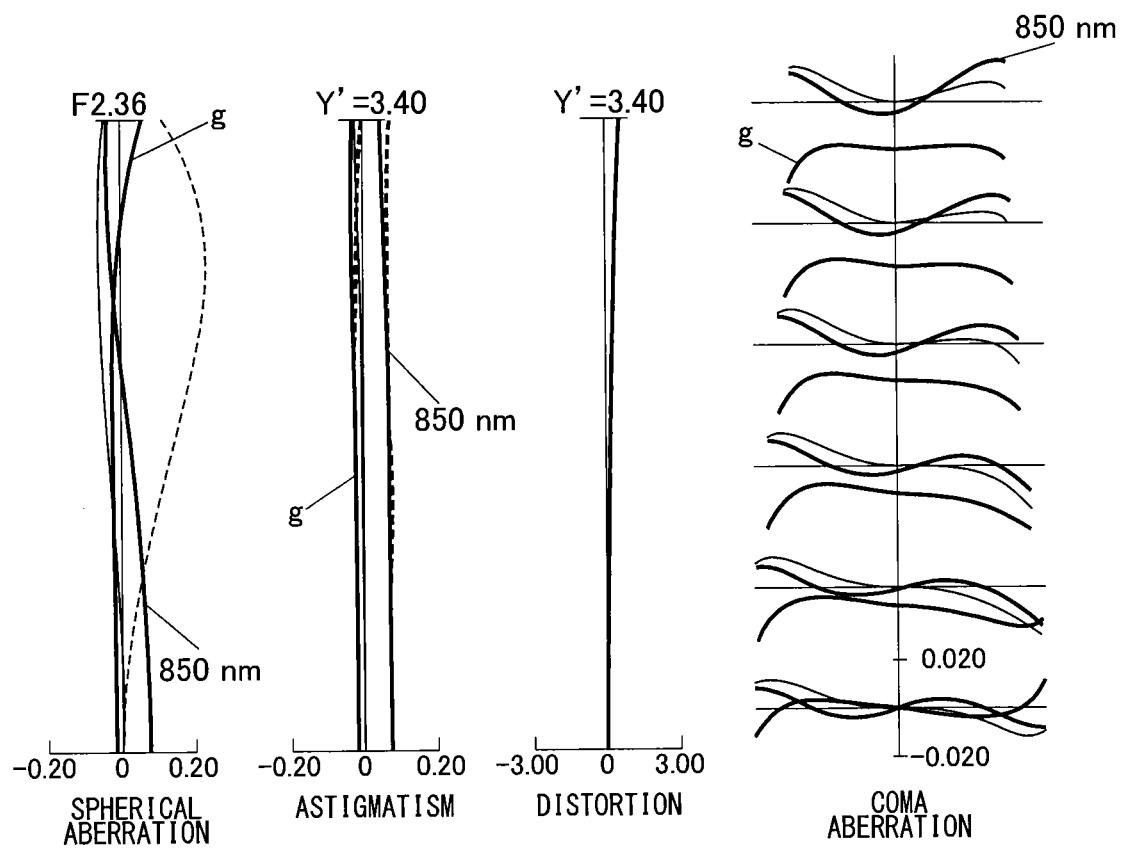
FIG. 16 shows aberration curve diagrams of spherical aberration, astigmatism, distortion, and coma aberration at the long focal length end of the zoom lens according to Example 4 of the present invention shown in FIG. 13C.

Additionally, in each of FIGS. 14, 15, and 16, aberration diagrams of spherical aberration, astigmatism, distortion, and coma aberration at each of the short focal length end (wide-angle end), the mean focal length, and the long focal length end (telephoto end) of Example 4 are shown. Please note that in the aberration diagrams, a dashed line in a spherical aberration diagram expresses a sine condition, a solid line and a dashed line in an astigmatism diagram express aberration in a sagittal image plane and aberration in a meridional image plane, respectively. The same are true in other Examples.

As is clear from FIGS. 14 to 16, in the zoom lens of Example 4 aberrations are sufficiently corrected. It is possible to correspond to a 1 mega-pixel to 5 mega-pixel light-receiving element. And therefore, it is obvious that structuring the zoom lens as in Example 4 makes it possible to achieve sufficient miniaturization, and ensure extremely favorable image performance.

Fifth Embodiment

Next, with reference to FIGS. 17 to 19, a camera according to a fifth embodiment of the present invention in which the zoom lens as in any one of Examples 1 to 4 according to the first to fourth embodiments of the present invention is used as a photographing optical system or a video recording optical system will be explained.

Figure 17:
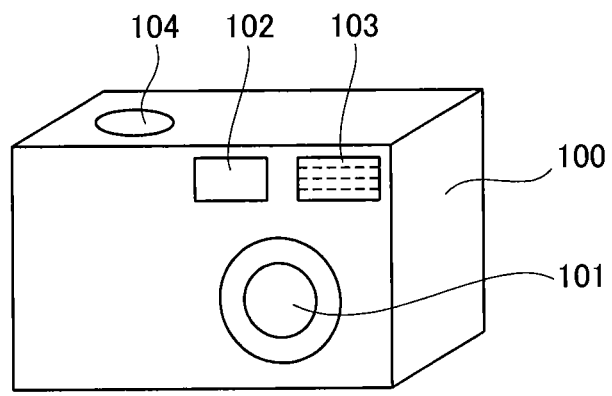
FIG. 17 is a perspective diagram which schematically shows an external structure as seen from an object side of a digital camera as a camera according to a fifth embodiment of the present invention.

FIG. 17 is a perspective diagram which schematically shows an external structure of a digital camera as seen from the object side as the camera according to the fifth embodiment of the present invention. FIG. 18 is a perspective diagram which schematically shows an external structure of the digital camera as seen from a photographer's side. FIG. 19 is a block diagram which schematically shows a function structure of the digital camera. Please note that in FIGS. 17 to 19, the digital camera as the camera is explained; however, an imaging function equivalent to the digital camera or the like is often included in not only a video camera mainly for video recording and imaging devices mainly exclusive for imaging including a traditional film camera using a so-called silver-halide film, and the like, but also in a mobile phone, a portable information terminal device referred to as a PDA (Personal Data Assistant) or the like, and additionally, an information device of various kinds including a portable information terminal device such as a so-called smartphone, tablet terminal, or the like including the functions of the above.

Such an information device also includes the function and structure which are substantially completely the same as those of the digital camera or the like, although the external appearance is slightly different, and in such an information device, the zoom lens according to any one of the first to fourth embodiments of the present invention can be used as an imaging optical system.

Figure 18:
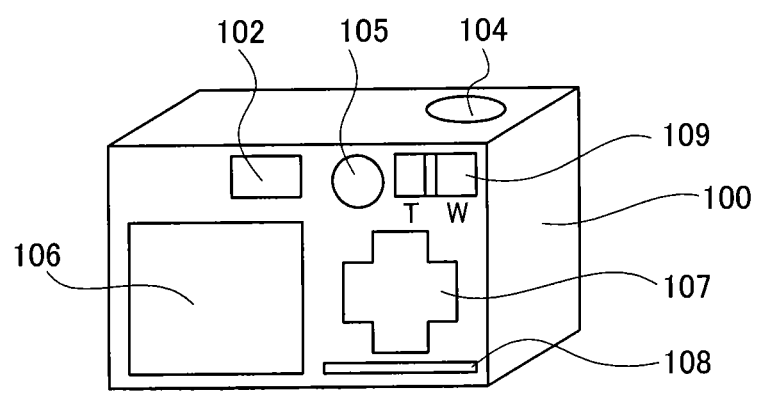
FIG. 18 is a perspective diagram which schematically shows an external structure of the digital camera of FIG. 17 as seen from a photographer's side.
Figure 19:
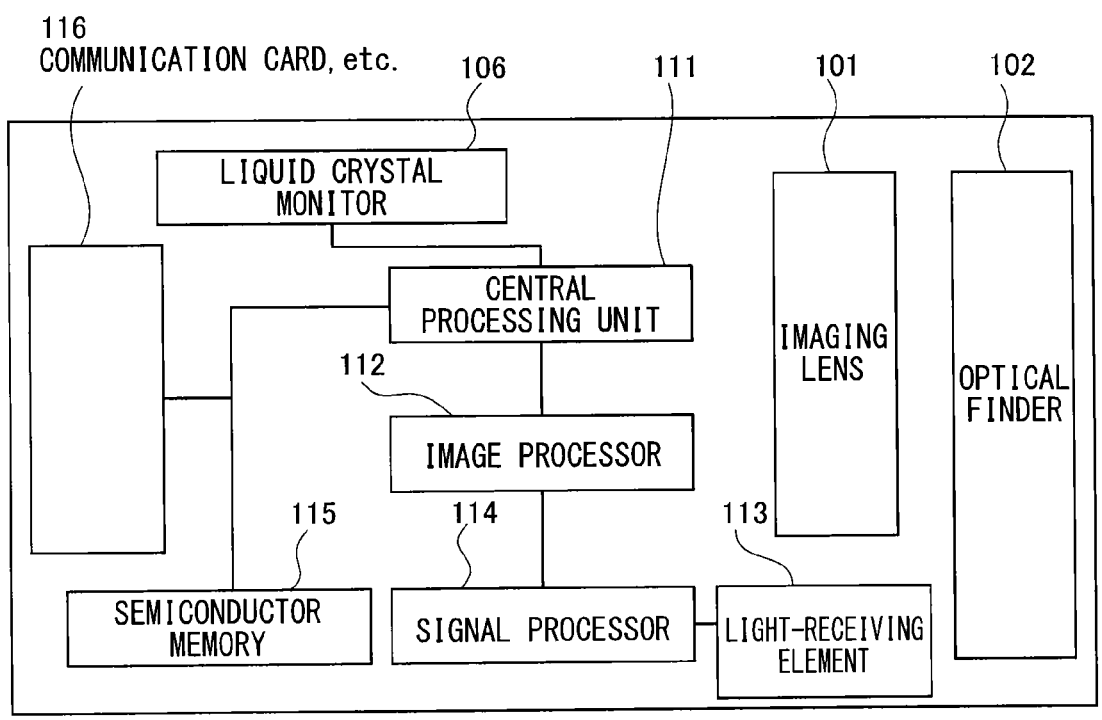
FIG. 19 is a block diagram which shows a function structure of the digital camera of FIGS. 17 and 18.

As shown in FIGS. 17 and 18, the digital camera includes a camera body 100, and in the camera body 100, an imaging lens (photographing lens) 101, an optical finder 102, a flash (electronic flash light) 103, a shutter button 104, a power switch 105, a liquid crystal monitor 106, an operation button 107, a memory card slot 108, a zoom switch 109, or the like are included. Further, as shown in FIG. 19, in the camera body 100, a central processing unit (CPU) 111, an image processor 112, a light-receiving element 113, a signal processor 114, a semiconductor memory 115, and a communication card, etc. 116.

The digital camera includes the imaging lens 101 as an imaging optical system, the light-receiving element 113 structured as an image sensor by using a CMOS (Complementary Metal-Oxide Semiconductor) image sensor, a CCD (Charge-Coupled Device) image sensor, or the like, and an optical image of a photographic subject formed by the imaging lens 101 is read by the light-receiving element 113. As the imaging lens 101, the zoom lens according to any one of the first to fourth Embodiments as explained in Examples 1 to 4 is used.

Output of the light-receiving element 113 is processed by the signal processor 114 controlled by the central processing unit 111, and converted to digital image information. After performing predetermined image processing in the image processor 112 also controlled by the central processing unit 111, the digital image information digitized by the signal processor 114 is recorded on the semiconductor memory 115 such as a non-volatile memory or the like. In this case, the semiconductor memory 115 can be a memory card inserted in the memory card slot 108, and can be an on-board semiconductor memory built in a body of the digital camera. On the liquid crystal monitor 106, a photographing image can be displayed while performing photographing, and an image recorded on the semiconductor memory 115 can be displayed. Additionally, images recorded on the semiconductor memory 115 can be sent to an external device via the communication card, etc. 116 inserted in a communication card slot (which is not clearly shown; however, the memory card slot 108 can be used as well).

The imaging lens 101 is structured such that its surface on the object side is covered by a lens barrier (not clearly shown) when carrying the camera, and when the power switch 105 is operated by a user to be turned on, the lens barrier opens, and the surface on the object side is exposed. At this time, inside a lens barrel of the imaging lens 101, each optical system of the lens groups constituting the zoom lens is arranged at the short focal length end, for example, and by operating the zoom switch 109, arrangement of each optical system of the lens groups is varied, and it is possible to perform magnification varying operation toward the long focal length end via the mean focal length.

An optical system of the optical finder 102 also preferably varies magnification in accordance with change of the field angle of the imaging lens 101.

In many cases, by half-pressing operation of the shutter button 104, focusing is performed.

Focusing in the zoom lens according to each of the first to the fourth embodiments (the zoom lens shown in each of the Examples 1 to 4) can be performed by movement of a part of the plurality of the lens groups constituting the zoom lens. When the shutter button 104 is further pressed and fully pressed, photographing is performed, and then the processing described above is performed.

In a case of displaying the image recorded on the semiconductor memory 115 on the liquid crystal monitor 106, and sending it to the external device via the communication card, etc. 116, the operation button 107 is operated in a predetermined manner. The semiconductor memory 115 and the communication card, etc. 116 are inserted in exclusive slots such as the memory card slot 108 and a communication card slot or the like, respectively, or in a general slot, and used.

When the imaging lens 101 is in a collapsed state, each imaging forming lens is not necessarily arranged on an optical axis. For example, if it is structured such that when being collapsed, at least one of the second lens group G2 and the third lens group G3 is displaced from the optical axis, and stored in parallel with other lens groups, it is possible to achieve a further thinner digital camera.

In an imaging device as the above-described digital camera (camera) or an information device having a similar imaging function, as described above, the imaging lens 101 structured by using the zoom lens as described in any one of the first to the fourth embodiments (any one of Example 1 to Example 4) can be used as a photographing optical system. Therefore, it is possible to achieve an information device such as a portable information terminal device or the like having the imaging device which uses an image sensor having 1 mega pixels to 5 mega pixels or the number of pixels equal to more than those, and is small in size with high picture quality, or a similar imaging function.

Additionally, the structure of the zoom lens according to each of the first to the fourth embodiments is applicable as a photographing lens of a traditional silver-halide film camera or a projection lens of a projector.

According to the embodiments of the present invention, it is possible to provide a zoom lens which has a high variable magnification ratio, sufficiently corrects aberration even in a near-infrared wavelength region, and is small in size.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A zoom lens comprising: in order from an object side to an image side,
a first lens group with a positive refractive power;
a second lens group with a negative refractive power;
a third lens group with a negative refractive power; and
a fourth lens group with a positive refractive power,
and when varying magnification from a short focal length end to a long focal length end, the first lens group is fixed, the second lens group is moved to the image side, the third lens group is moved, and the fourth lens group is fixed, wherein the first lens group is constituted of, in order from the object side to the image side, a cemented lens of a negative lens and a first positive lens, a second positive lens, and a third positive lens, and the fourth lens group is constituted of a lens group arranged on the object side and a lens group arranged on the image side with a largest distance in the fourth lens group between them, and at least one positive lens of positive lenses included in the lens group arranged on the object side of the fourth lens group and the second and third positive lenses of the first lens group satisfy Conditional Expression (1): $1.40<n_d<1.65$, Conditional Expression (2): $65.0<v_d<100.0$, and Conditional Expression (3): $0.015<P_{g,F}-(-0.001802\times v_d+0.6483)<0.060$, where $N_d$, $v_d$, and $P_{g,F}$ are a refractive index, Abbe number, and a partial dispersion ratio, respectively, of each of the at least one positive lens of positive lenses included in the lens group arranged on the object side of the fourth lens group, and the second and third positive lenses of the first lens group, and here, $P_{g,F}=(n_g-n_F)/(n_F-n_C)$, and $n_g$, $n_F$, and $n_C$ are refractive indexes with respect to g line, F line, and C line, respectively, of each of the at least one positive lens of positive lenses included in the lens group arranged on the object side of the fourth lens group, and the second and third positive lenses of the first lens group.

2. The zoom lens according to claim 1, wherein Conditional Expression (4): $0.5<f13/f14<1.1$ is satisfied, where f13 is a focal length of the second positive lens included in the first lens group, and f14 is a focal length of the third positive lens included in the first lens group.

3. The zoom lens according to claim 1, wherein Conditional Expression (5): $1.70<n_d<1.95$, and Conditional Expression (6): $35.0<v_d<50.0$ are satisfied, where where $n_d$ is a refractive index of the negative lens included in the first lens group, and $v_d$ is Abbe number of the negative lens included in the first lens group.

4. The zoom lens according to claim 2, wherein Conditional Expression (5): $1.70<n_d<1.95$, and Conditional Expression (6): $35.0<v_d<50.0$ are satisfied, where where $n_d$ is a refractive index of the negative lens included in the first lens group, and $v_d$ is Abbe number of the negative lens included in the first lens group.

5. The zoom lens according to claim 1, wherein at least two positive lenses of the positive lenses included in the lens group arranged on the object side of the fourth lens group satisfy the Conditional Expressions (1), (2), and (3).

6. The zoom lens according to claim 1, wherein the lens group arranged on the object side of the fourth lens group is constituted of, in order from the object side to the image side, a positive lens, a positive lens, a positive lens, a negative lens, and a positive lens.

7. The zoom lens according to claim 1, wherein Conditional Expression (7): $0.2<D4a/D4<0.4$ is satisfied, where D4a is a largest inter-lens distance in the fourth lens group, and D4 is a thickness of the fourth lens group.

8. The zoom lens according to claim 1, wherein Conditional Expression (8): $0.7<f1/ft<0.9$, and Conditional Expression (9): $0.1<f4/ft<0.3$ are satisfied, where f1 is a focal length of the first lens group, f4 is a focal length of the fourth lens group, and ft is a focal length of an entire optical system at the long focal length end.

9. The zoom lens according to claim 1, wherein focusing is performed by the first lens group.

10. A camera comprising the zoom lens according to claim 1 as a photographing optical system.

11. A camera comprising the zoom lens according to claim 1 as a video recording camera optical system.

12. A portable information terminal device comprising the zoom lens according to claim 1 as a photographing optical system of a camera function part.

* * * * *